(12) United States Patent
de Paula Carneiro Ribeiro

(10) Patent No.: US 11,373,225 B2
(45) Date of Patent: Jun. 28, 2022

(54) METHOD AND COMPUTER SYSTEM FOR GENERATING A RISK RATING AND METHOD FOR LIQUIDATING AN ASSET

(71) Applicant: Kobold Gestora de Fundos Ltda, Sao Paulo (BR)

(72) Inventor: Fernando de Paula Carneiro Ribeiro, Sao Paulo (BR)

(73) Assignee: KOBOLD GESTORA DE FUNDOS LTDA, Sao Paulo-Sp (BR)

( * ) Notice: Subject to any disclaimer, the term of this patent is extended or adjusted under 35 U.S.C. 154(b) by 189 days.

(21) Appl. No.: 16/444,852

(22) Filed: Jun. 18, 2019

(65) Prior Publication Data

US 2020/0311789 A1    Oct. 1, 2020

(30) Foreign Application Priority Data

Mar. 28, 2019    (BR) .................... BR102019006237-1

(51) Int. Cl.
   *G06Q 30/06*    (2012.01)
   *G06Q 10/06*    (2012.01)
   (Continued)

(52) U.S. Cl.
   CPC ....... *G06Q 30/0609* (2013.01); *G06Q 10/063* (2013.01); *G06Q 10/0633* (2013.01);
   (Continued)

(58) Field of Classification Search
   None
   See application file for complete search history.

(56) References Cited

U.S. PATENT DOCUMENTS

2003/0236735 A1    12/2003    Brennan et al.
2008/0015920 A1*    1/2008    Fawls .................... G06Q 50/18
                                                       705/7.41
(Continued)

FOREIGN PATENT DOCUMENTS

WO    WO-2020061105 A1 *    3/2020    ............. G06F 21/33

OTHER PUBLICATIONS

Mattias Scherer, Performance and Scalability of Blockchain Networks and Smart Contracts (Year: 2017).*
(Continued)

*Primary Examiner* — Amanda Gurski
(74) *Attorney, Agent, or Firm* — Alston & Bird LLP

(57) ABSTRACT

Described is a method for generating a score risk ($I_R$), the method comprising the steps of: receiving at least one purchase order for at least one asset (DC), the purchase order of the asset generated from an agreement (A) established between a first entity (C) and a second entity (V), the agreement linked to the performance of an action between the entities. The generation of the agreement (A) also generates an ideal transactional ballast ($L_I$) comprising a plurality of ideal markers wherein each one of the ideal markers is related to the agreement (A) established between the entities (C,V). The performance of the action between the entities generates a real transactional ballast ($L_R$) comprising a plurality of real markers, wherein each one of the real markers is related to the action carried out between the entities, wherein the method further comprises the step of generating and updating the score risk based on the comparison between each one of the real markers and each one of the ideal markers.

22 Claims, 7 Drawing Sheets

(51) Int. Cl.
  *G06Q 30/00*     (2012.01)
  *G06Q 20/38*     (2012.01)
  *G06Q 20/02*     (2012.01)

(52) U.S. Cl.
  CPC ..... *G06Q 10/0635* (2013.01); *G06Q 10/0639* (2013.01); *G06Q 10/06312* (2013.01); *G06Q 10/06313* (2013.01); *G06Q 10/06316* (2013.01); *G06Q 20/02* (2013.01); *G06Q 20/382* (2013.01); *G06Q 30/018* (2013.01); *G06Q 30/0633* (2013.01)

(56) References Cited

U.S. PATENT DOCUMENTS

2017/0132626 A1* 5/2017 Kennedy .............. G06Q 20/401
2017/0286870 A1* 10/2017 Hoover ................. G06N 5/045

OTHER PUBLICATIONS

Mattias Scherer, "Performance and Scalability of Blockchain Networks and Smart Contracts," Spring 2017, Umea University, pp. 1-41 (Year: 2017).*

Xingxiong Zhu, "Blockchain-Based Identity and Authentication and Intelligent Credit Reporting," 2019, International Symposium on Big Data and Applied Statistics, vol. 2, pp. 1-5 (Year: 2019).*

* cited by examiner

METHOD AND COMPUTER SYSTEM FOR GENERATING A RISK RATING AND METHOD FOR LIQUIDATING AN ASSET

CROSS REFERENCE TO RELATED APPLICATIONS

This application claims priority to and the benefit of Brazilian Patent Application No. BR102019006237-1, filed Mar. 28, 2019, the entire contents of which as are hereby incorporated by reference.

BACKGROUND

Related Field

The present invention refers to a method and system for generating a score risk. More specifically, the present invention evaluates the existing score risk in an action carried out between two entities.

Related Art

The practice of business is the basis for economic movement and is present in the day-to-day life of each individual and company. Every day, an infinity of agreements is entered into between companies and/or individuals and that are designed to specify the bases for supplying a given item or carrying out a given service of a selling entity to a buying entity.

Comprising the most varied levels of details and complexity, agreements finalized between parties basically establish the parameters to be followed between seller and buyer so that the item under negotiation is supplied, thus satisfying the interests of both buyer and seller.

In a merely hypothetical description, a consolidated agreement between a selling entity and a buying entity for the supply of a given item establishes an expectation of a date so that the item is duly delivered to the buyer, such that it is incumbent upon the selling entity to perform the necessary procedures so that the item is delivered on the agreed-upon date.

It so happens that, for various reasons, the practical realization of the terms established in an agreement ends up not happening as planned, so there is always a score risk linked to any agreement established.

In line with the hypothetical description commented upon previously, the agreement established for supplying a given item entails risks for both selling entity and buying entity.

For the buyer, there is, for example, the risk linked to the supply of the item on a different date to the one agreed-upon, and further, in an extreme but not rare case scenario, there is the risk that the buyer pays for the product, but never receives it.

For the seller, for example, there is the risk linked to the supply of the item in the timelines stipulated, but without effectively receiving the monetary amount agreed upon.

In one example that is extremely common nowadays, the acquisition of an item by a buyer is finalized by paying a portion of the total amount agreed upon between buyer and seller, such that, when receiving said portion of the payment, it is incumbent upon the seller to begin to take the necessary steps so that the item is delivered to the buyer.

In this scenario, the remaining amount is paid, for example, at the time of delivery of the item. Alternatively, it is commonplace for the payment of the remaining amount to be diluted (paid by installments) over time.

Therefore, and concentrating the risks involved from the standpoint of the selling entity, latter must begin to take the steps to deliver the item to the buyer having received just one part of the agreed-upon amount, that is, there is always a real risk that the outstanding debt may not be settled by the buyer. The risk is even greater in the scenario wherein a selling entity sends the information (as it supplies an item or performs a service) to the buyer without receiving any amount initial payment.

Furthermore, the cash flow of the selling company, upon implementing an agreement to supply an item such as mentioned previously (sale by installment payments), is extremely compromised, since the company will only have received the total amount several months after concluding the agreement.

Therefore, and in need of immediate funds to maintain its operations, it is commonplace for certain entities to opt to anticipate their receivables, thus issuing bonds to be acquired by third party entities.

Therefore, third party companies usually opt to assume the risks involved in a transaction agreed upon between a selling entity and a buying entity.

It is emphasized that by anticipating the receivables to the selling company, and unless agreed otherwise, the third entity is assuming the risks of both buying party and selling party, that is, a financial entity assumes the risks that the selling company will not supply the item and also assumes the risks that the payer will not meet that agreed upon financially.

It so happens that the state of the art fails to disclose a suitable methodology for generating a score risk that enables an evaluation of the risks involved in a negotiation involving two entities.

More specifically, the evaluation of risks is currently determined based substantially on the reputation held by the buyers and sellers on the market, such that there is no risk analysis that effectively considers specific parameters of the agreement entered into between buyer and seller, that is, an analysis that can determine whether the item acquired by the buyer is in fact in the process of being delivered, based on the terms established in the contract.

Certain documents from the state of the art even describe the integration between financial and logistical aspects, as is the case of patent application US 2003/0236735. This document describes a provider of logistics services (Logistics Service Provider—LSP) which consists of logistical and financial aspects, with a view to improving the negotiation between buyers and sellers.

It so happens that the proposal of this document effectively consists of monitoring the transport of a given item so as to evaluate whether said transport is in agreement with a trajectory seen as ideal. If the transport is not near the ideal, said anteriority evaluates the need to take corrective actions relating to the dispatch of the item, such that taking such corrective actions is based on, for example, the value of the negotiation and the credit risks involved.

It is thus understood that the teachings of US 2003/0236735 are effectively concentrated on forms of altering (correcting) the dispatch route of an item so as to maximally boost the value of the transaction.

Said proposal differs from the teachings addressed in the present invention, such that the aim of the methodology and of the system addressed herein effectively consists of evaluating the risks of a transaction already agreed upon between a seller and a buyer, such that the objective is not to correct or alter the dispatch route of an item.

In the present invention, the way in which the terms of the agreement will be implemented are entirely up to the parties, that is, in the methodology proposed, the way in which an item will be sent should be decided solely by the selling and buying entities, such that the teachings proposed herein make it possible to know whether said dispatch is in fact occurring, but without the aim of altering or correcting the dispatch route of the item.

In other words, and when considering a scenario wherein a third entity anticipates the receivables for a selling company, the present invention allows us to know in fact whether the item provided by the selling company is included in the real economy.

An additional advantage stemming from the teachings proposed herein is the generation of a score risk and its update in real time as and when the agreement between seller and buyer is effectively put into practice.

Furthermore, the teachings of the present invention enable the generation of a transactional ballast for all the operations carried out, that is, based on said transactional ballast, it is possible to know whether the stages carried out to supply an item occur as previously agreed upon. So it is possible to generate a record of transactional ballasts both of the selling and buying entities, and also of any external agent participating in the consolidation process of the agreement between seller and buyer.

In one example, said record of transactional ballasts can serve as basis for the initial generation of a score risk as soon as an operation to anticipate receivables is offered, thus enabling a given entity to evaluate, before providing the receivables, the record of the seller, buyer, or of any external agent participating in the process.

Therefore, the present invention proposes a method and system that enables the generation and update of a score risk, as addressed in detail ahead.

BRIEF SUMMARY

The objective of the present invention is to provide a computer method for generating a score risk linked to the acquisition of a certain asset.

It is an additional objective of the present invention to provide a computer method that enables a score risk to be updated in real time as and when an action between a selling entity and a buying entity is carried out.

The objective of the present invention is also to provide a computer method capable of generating a score risk based on a record of transactional ballasts performed between a selling entity and a buying entity.

It is also an objective of the present invention to provide a method for generating a score risk, wherein said rating is updated based on the comparison between an ideal transactional ballast and a real transactional ballast.

An additional objective of the present invention consists of providing a computer system for generating a score risk in harmony with the method proposed.

The present invention also has the objective of providing a method and system that enable the behavior of certain entities to be monitored.

The objectives of the present invention are achieved by way of a computer method for generating a score risk through a communications network, the method comprising the steps of: receiving at least one purchase order of at least one asset, the purchase order of the asset generated from an agreement established between a first entity and a second entity, the agreement linked to the performance of an action between the entities. Wherein the generation of the agreement between the first entity and the second entity also generates an ideal transactional ballast, the ideal transactional ballast comprising a plurality of ideal markers wherein each one of the ideal markers is related to the agreement established between the entities. Wherein the performance of the action between the entities generates a real transactional ballast, the real transactional ballast comprising a plurality of real markers, wherein each one of the real markers is related to the action carried out between the entities. The method further comprising the step of: generating and updating the score risk based on the comparison between each one of the real markers and each one of the ideal markers.

The objectives of the present invention are further achieved by way of a computer system for generating a score risk, said computer system capable of carrying out the stages proposed for the method addressed in the present invention.

BRIEF DESCRIPTION OF THE FIGURES

The present invention will now be described in greater detail based on an execution example represented in the drawings. The figures show:

FIG. 1—is a block representation of the teachings addressed in the present invention, wherein FIG. 1(a) indicates the performance of an action between a first entity and a second entity, while FIG. 1(b) is a representation of the ideal markers present in an agreement as well as the real markers captured from a third entity;

FIGS. 6(a) and 6(c) illustrate representations wherein a favorable expectation parameter is generated and FIG. 6(b) illustrates a representation wherein an unfavorable expectation parameter is generated;

DETAILED DESCRIPTION OF VARIOUS EMBODIMENTS

Figure 1:
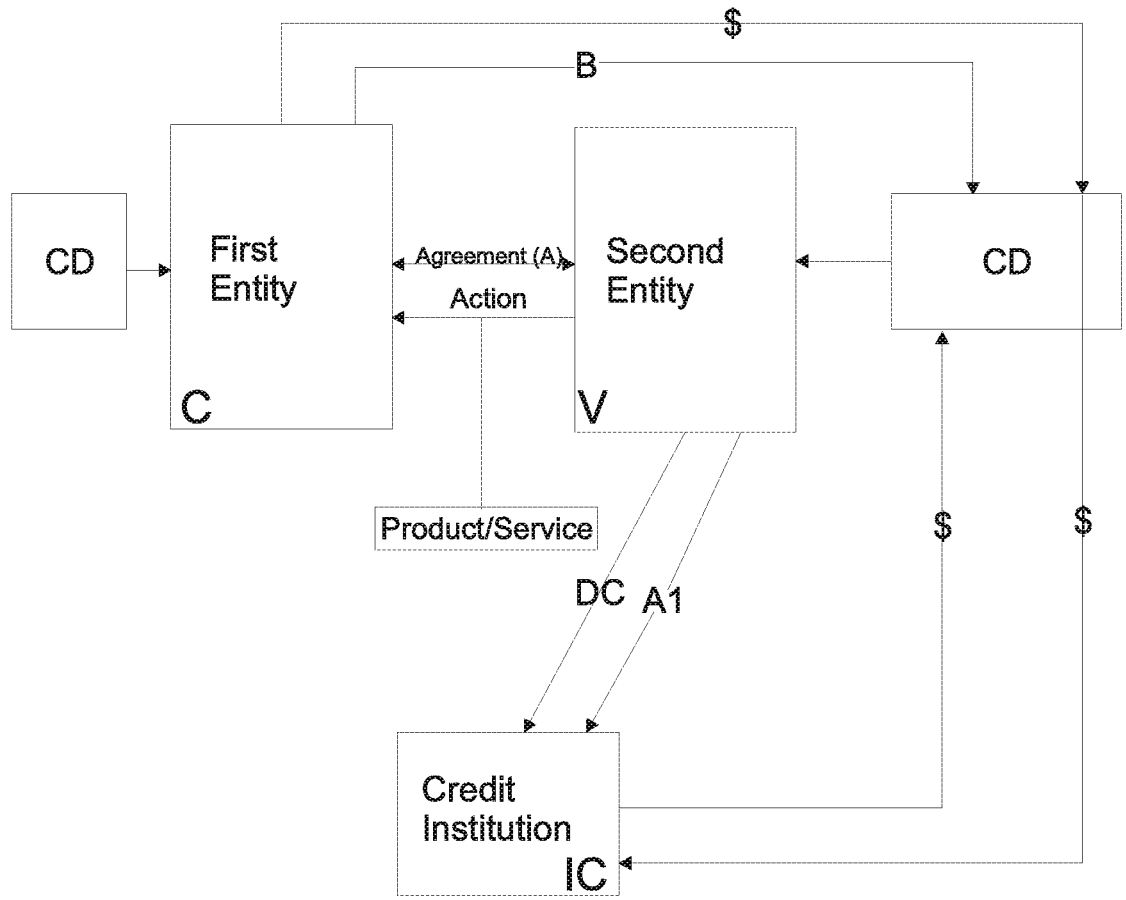
Figure 1:
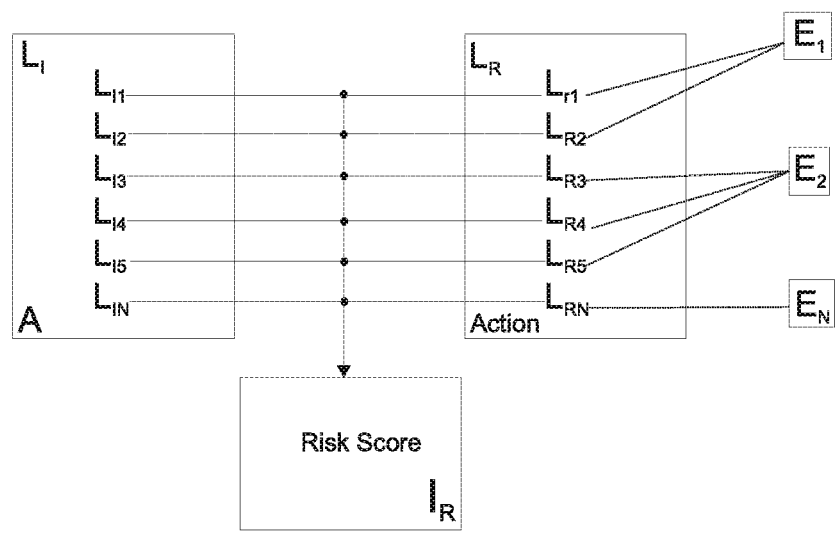

In reference to FIGS. 1 to 7, the present invention addresses a method and computer system for generating a score risk $I_R$ through a communications network. In one embodiment, said communications network may be understood as the Internet.

In a fully valid embodiment, the method proposed is configured so as to indicate the score risk $I_R$ linked to the performance of an action between a first entity C and a second entity V, such that, viewing an improved understanding of the characteristics presented in the present invention, said first entity C is also referred to as a buying entity and the second entity V is also referred to as a selling entity.

In general terms, and as represented in FIG. 1(a), it is understood that a certain action will be carried out between a first entity C and a second entity V, in a non-limitative example, said action may be understood to be the provision of a given product or raw material from a selling company to a buying company, wherein the selling company has the duty to deliver said product and a buying company has the duty to pay for said product.

Similarly, and as an additional example, said action may be understood as the performance of a given service provided by the selling company to the buying company. Therefore, the selling company is hired to provide a given service, said service being afforded by the buying company.

Basically, any act carried out between two parties (companies and/or individuals) may fall under the description relating to the performance of an action between a buyer and a seller.

During the course of the present description, said action will be exemplified as referring to the supply of a given product by the second entity (seller) to the first entity (buyer), wherein, so that the dispatch procedures of the product from the seller to the buyer can begin, a buying party may, in some situations, afford just one part of the total amount agreed upon to carry out the action.

In other words, the selling party, in order to provide the product, will receive just a small portion of the total amount agreed upon in the negotiation, such that the remaining portions will be afforded by the buyer when latter already has the product in its possession. Obviously, the description commented upon above should not be understood as a limitative characteristic of the present invention.

In this embodiment of the present invention, it is further understood that the selling company is, for various reasons, interested in receiving in advance the total amount agreed upon to supply the product.

In other words, and also as indicated in FIG. 1(a), the selling entity has the possibility of offering to a third entity a purchase order of at least one asset, such that, considering the present description, said asset can be construed as the funds that the selling entity wishes to receive, so said asset can be construed as a credit right DC offered by the selling company V to a third entity, such as a credit institution IC.

Therefore, the methodology proposed in the present invention takes as basis the receipt of a purchase order of the asset DC, wherein the purchase order of the asset DC is generated based on a consent established between seller and buyer to perform an action, that is, the supply of a product or performance of a service, according to the present preferred description.

In other words, the consent established between seller and buyer can be construed as an agreement, the latter defining the conditions to supply the product/perform the service, such that said conditions meet the interests of both selling party and buying party.

As known by persons skilled in the art, the generation of the agreement between buyer and seller comprises a series of definitions (clauses) and parameters that should be followed by the parties so that both buyer and seller have all their expectations met.

In the methodology proposed in the present invention said definitions of an agreement will be referred to as markers, more specifically, and by an agreement indicating the parameters that the parties see as ideal for performing a certain action, the markers will be referred to as ideal markers.

Therefore, in a non-exhaustive description and as represented in FIG. 1(b), a certain agreement may comprise a plurality of ideal markers $L_{I1}, L_{I2}, L_{I3}, L_{I4}, L_{I5} \ldots L_{IN}$ which may establish, for example:

$L_{I1}$: Estimated date for initial payment by the buyer;
$L_{I2}$: Estimated date for the product to be dispatched by the seller;
$L_{I3}$: Estimated date for receipt of the product by the buyer.

In any case, it is known that the existence of the so-called ideal markers $L_{I1}, L_{I2}, L_{I3}, L_{I4}, L_{I5} \ldots L_{IN}$ in an agreement does not effectively guarantee that the performance of the action will effectively occur as agreed. That is, however much an agreement defines the interests and duties of a party, it is common for the action in practice ultimately not to occur as agreed.

Therefore, the performance of the action between the entities C and V generates a plurality of real markers $L_{R1}, L_{R2}, L_{R3}, L_{R4}, L_{R5} \ldots L_{RN}$, such that, in harmony with that previously described, said real markers $L_{R1}, L_{R2}, L_{R3}, L_{R4}, L_{R5} \ldots L_{RN}$ establish effectively practical parameters of the action agreed upon between the parties, that is:

$L_{R1}$: Date of payment by the buyer;
$L_{R2}$: Date on which the product is dispatched by the selling entity;
$L_{R3}$: Date on which the product is delivered to the buyer.

As addressed in detail during the course of the present specification, the present invention takes as basis the comparison between each one of the real markers $L_{R1}, L_{R2}, L_{R3}, L_{R4}, L_{R5} \ldots L_{RN}$ with each one of the ideal markers $L_{I1}, L_{I2}, L_{I3}, L_{I4}, L_{I5} \ldots L_{IN}$ whereby generating the score risk $I_R$.

Figure 2:
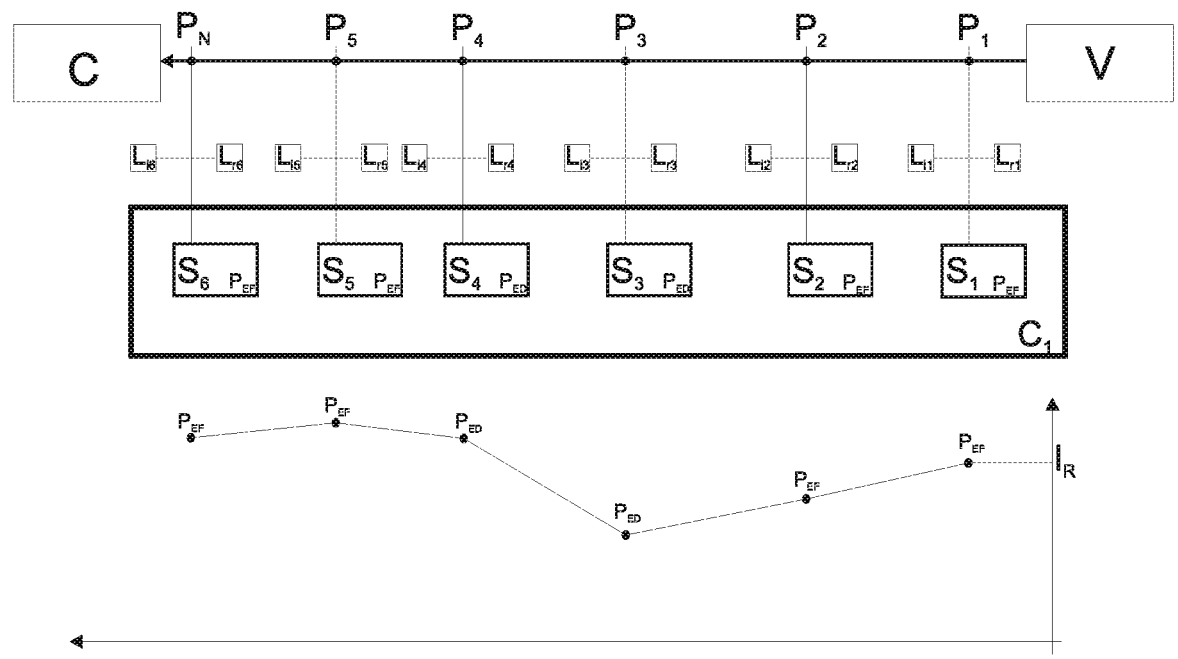
FIG. 2—is a block representation of one of the stages present in the methodology addressed in the present invention, indicating the generation of the chain of records as well as the generation and update of a score risk based on the expectation parameters.

More specifically, and now in reference to FIG. 2, it is understood that any action carried out between the entities C and V is delimited by a start and end, that is, considering said action as the supply of a given item, said action will have a start (order for the supply of the item) and an end (item was supplied). Similarly, and considering said action as the performance of a service, said action will have a start (hiring the service) and end (service carried out). Obviously, the start and end events previously commented upon should not construe a limitative characteristic of the present invention, such that any point of an action can be construed as its start and end.

In reference to FIG. 2, the start of action A is referred to as a first state of implementation $P_1$ and the end of the action is referred to as a second state of implementation $P_N$, further, a plurality of intermediary states $P_2, P_3, P_4, P_5$ (action being carried out) are defined between the start $P_1$ and the end $P_N$ of action A.

Therefore, the teachings of the present invention propose the generation of a validation seal $S_1, S_2, S_3, S_4, S_5 \ldots S_N$ resulting from the comparison between each one of the real markers $L_{R1}, L_{R2}, L_{R3}, L_{R4}, L_{R5} \ldots L_{RN}$ with the ideal markers $L_{I1}, L_{I2}, L_{I3}, L_{I4}, L_{I5} \ldots L_{IN}$.

More specifically, and taking FIG. 2 as reference, it is considered that the action carried out between the parties are in its first state of implementation $P_1$, that is, in its initial state. In this regard, the teachings of the present invention propose the comparison between the first real marker $L_{R1}$ and the first ideal marker $L_{I1}$.

In this regard, it is important to compare whether the action effectively carried out between the parties is in fact occurring as foreseen in the agreement and, based on said comparison a validation seal is generated. Therefore, and in reference to FIG. 2, the comparison between the first real marker $L_{R1}$ and the first ideal marker $L_{I1}$ generates a first validation seal $S_1$.

Similarly, and as and when the performance of the action moves through intermediary states of implementation $P_2$, $P_3$, $P_4$, $P_5$, each ideal marker should be compared with its respective real marker and thus generate a validation seal for each comparison made. In reference to the example illustrated in FIG. 3, the generation of the first $S_1$, second $S_2$, third $S_3$, fourth $S_4$, fifth $S_5$ and sixth $S_6$ validation seals are respectively noted.

Therefore, each of the validation seals $S_1$, $S_2$, $S_3$, $S_4$, $S_5$, $S_6$ . . . $S_N$ act as a validator of the occurrence of the action between the entities, that is, the validation seals may be understood as stamps that indicate the confirmation of the performance of the action between the parties. In other words, each validation seal $S_1$, $S_2$, $S_3$, $S_4$, $S_5$, $S_6$ . . . $S_N$ indicates the status of the action carried out between the parties, that is, each validation seal $S_1$, $S_2$, $S_3$, $S_4$, $S_5$, $S_6$ . . . $S_N$ indicates whether the action between the parties has occurred (or is occurring) in conformity with that planned.

More specifically, and as addressed ahead, it is proposed that each validation seal $S_1$, $S_2$, $S_3$, $S_4$, $S_5$, $S_6$ . . . $S_N$ should comprise information on an expectation parameter $P_E$, and this parameter may attain a favorable status or an unfavorable status. In other words, it is understood that each validation seal $S_1$, $S_2$, $S_3$, $S_4$, $S_5$, $S_6$ . . . $S_N$ assumes a favorable or unfavorable status.

Further in reference to FIG. 2, an additional advantage of the methodology proposed in the present invention consists of generating a validation chain $C_1$ based on each of the validation seals $S_1$, $S_2$, $S_3$, $S_4$, $S_5$ and $S_6$ generated. More specifically, a validation chain $C_1$ is generated from the grouping of the validation seals $S_1$, $S_2$, $S_3$, $S_4$, $S_5$ and $S_6$ generated for a certain action.

Therefore, it is understood that based on FIG. 2 the performance of an action between the entities V and C generates a plurality of validation seals $S_1$, $S_2$, $S_3$, $S_4$, $S_5$ and $S_6$ obtained based on the comparison between the real and ideal markers. Moreover, the performance of the action between the entities generates a single validation chain $C_1$. In other words, the validation chain $C_1$ can be understood as a block that groups all the validation seals generated for that action which was carried out between the second entity V and the first entity C.

Therefore, the validation chain $C_1$ acts as a chain of records of all the validation seals $S_1$, $S_2$, $S_3$, $S_4$, $S_5$ and $S_6$ generated for that action. Furthermore, and as an additional advantage of the methodology proposed in the present invention, the validation seals $S_1$, $S_2$, $S_3$, $S_4$, $S_5$ and $S_6$ as well as the validation chain $C_1$ are not displayed to the first entity C and to the second entity V, but rather to the institution IC which acquired the asset DC, reference is made to FIGS. 1 and 2.

In other words, the institution IC which acquired the asset DC may visualize, in real time and as and when the action is carried out, whether the asset DC acquired thereby is in fact being consolidated.

Therefore, the generation of the validation seals $S_1$, $S_2$, $S_3$, $S_4$, $S_5$ and $S_6$ as well as the validation chain $C_1$ enables institution IC to evaluate, in real time, the risks involved in a certain action carried out between the second entity V and the first entity C.

The advantages of the teachings proposed in the present invention are boosted when considering that an institution IC will acquire a plurality of assets DC involving the entities C and V, so and based on the validation seals $S_1$, $S_2$, $S_3$, $S_4$, $S_5$ and $S_6$ and the validation chain $C_1$ for each one of these actions, said institution IC will know the behavior of said entities during the performance of said action. Similarly, in generating validation chains $C_1$, $C_2$, . . . $C_N$ for each of the actions carried out between certain entities, it becomes possible to know the behavioral record of an entity.

As an additional characteristic of the present invention, each validation seal $S_1$, $S_2$, $S_3$, $S_4$, $S_5$ . . . $S_N$ is generated a single time only and cannot be altered. That is to say, once the validation seal $S_1$ is generated, the information contained therein cannot be altered, that is, said validation seal $S_1$ is generated a single time only and cannot be altered. The same occurs with the other validation seals $S_2$, $S_3$, $S_4$, $S_5$ . . . $S_N$ and for the validation chain $C_1$.

Therefore, the record chain $C_1$ acts as a certifying block of the action carried out between the entities C and V. Moreover, said record chain $C_1$ may be understood as a private chain of records, since it is displayed to the credit institution IC, but not for the first entity C or for the second entity V.

Therefore, the record chain $C_1$ can be understood as a blockchain, enabling said record chain $C_1$, which acts as a private chain, to be validated publicly.

Therefore, the record chain $C_1$ can be validated publicly, that is, going from a private environment (credit institution environment) to a public environment (environment outside the credit institution). Therefore, it is possible to validate that the information (validation seals $S_2$, $S_3$, $S_4$, $S_5$ . . . $S_N$) present in the record chain $C_1$ was generated a single time only and was not altered.

As commented upon previously, the present invention takes as basis the comparison between the real markers $L_{R1}$, $L_{R2}$, $L_{R3}$, $L_{R4}$, $L_{R5}$ . . . $L_{RN}$ and the ideal markers $L_{I1}$, $L_{I2}$, $L_{I3}$, $L_{I4}$, $L_{I5}$ . . . $L_{IN}$ for generating a score risk $I_R$.

Specifically, the score risk $I_R$ is generated based on at least one from among the following parameters: (i) the comparison between the real markers $L_{R1}$, $L_{R2}$, $L_{R3}$, $L_{R4}$, $L_{R5}$ . . . $L_{RN}$ with their respective ideal marker $L_{I1}$, $L_{I2}$, $L_{I3}$, $L_{I4}$, $L_{I5}$ . . . $L_{IN}$, (ii) the displacement of a performance rating $I_P$ and (iii) the risk values previously known from the first entity C and from the second entity V.

Therefore, it is proposed that the comparison between each one of the real markers $L_{R1}$, $L_{R2}$, $L_{R3}$, $L_{R4}$, $L_{R5}$ . . . $L_{RN}$ with their respective ideal marker $L_{I1}$, $L_{I2}$, $L_{I3}$, $L_{I4}$, $L_{I5}$ . . . $L_{IN}$ will generate an expectation parameter $P_E$, $P_{E1}$, $P_{E2}$, $P_{E3}$, $P_{E4}$, $P_{E5}$ . . . $P_{EN}$ which will indicate the expectation of success in implementing the action agreed upon between the parties. In particular, the expectation parameter acts as a beacon, interpreting the information obtained based on the comparison between the real and ideal markers, acting directly to generate and update of the score risk $I_R$.

Basically, it is proposed that each expectation parameter $P_E$, $P_{E1}$, $P_{E2}$, $P_{E3}$, $P_{E4}$, $P_{E5}$ . . . $P_{EN}$ is capable of assuming a favorable status $P_{EF}$ and an unfavorable status $P_{ED}$. Therefore, if the comparison between the real markers $L_{R1}$, $L_{R2}$, $L_{R3}$, $L_{R4}$, $L_{R5}$ with the ideal markers $L_{I1}$, $L_{I2}$, $L_{I3}$, $L_{I4}$, $L_{I5}$ indicate that the action is occurring as agreed, only favorable expectation parameters will be generated. On the other hand, if the comparison between any of the real and ideal markers indicates that the action is not occurring as agreed, an unfavorable expectation parameter $P_{EF}$ is generated.

The illustrated example in FIG. 2 indicates, in each of the validation seals $S_1$, $S_2$, $S_3$, $S_4$, $S_5$ and $S_6$ the expectation parameter generated based on the comparison between the real markers $L_{R1}$, $L_{R2}$, $L_{R3}$, $L_{R4}$, $L_{R5}$ and $L_{R6}$ and the ideal markers $L_{I1}$, $L_{I2}$, $L_{I3}$, $L_{I4}$, $L_{I5}$ and $L_6$. In this hypothetical example, it is noted that the validation seals $S_1$, $S_2$, $S_5$ and $S_6$ indicate favorable expectation parameters $P_{EF}$, and the seals $S_3$ and $S_4$ indicate unfavorable expectation parameters $P_{ED}$.

Therefore, and in reference to FIG. 2, the score risk $I_R$ can be generated and updated solely based on the expectation parameters $P_E$ of each of the validation seals $S_1$, $S_2$, $S_3$, $S_4$, $S_5$ and $S_6$. Therefore, if the comparison between the real and ideal markers results in a favorable expectation parameter (as in $S_1$, $S_2$, $S_5$ and $S_6$), the score risk $I_R$ is reduced. Alternatively, if said comparison results in an unfavorable expectation parameter (as in $S_3$ and $S_4$), then the score risk $I_R$ is incremented.

Besides the update of the score risk $I_R$ based on the expectation parameters $P_E$, as represented in FIG. 2, said score risk $I_R$ can be updated based on the displacement of a performance rating $I_P$.

Specifically, it was previously described that the action carried out between the entities C and V is delimited by a first state of implementation $P_1$ and by a second state of implementation $P_N$, such that $P_1$ indicates the start of the action and $P_N$ indicates the end of the action. Furthermore, it is understood that between the start $P_1$ and the end $P_N$ of the action there are intermediary states $P_2$, $P_3$, $P_4$, $P_5$ indicating that the action is being executed.

Therefore, the performance rating $I_P$ should be understood as the time period from the start up to the end of the action carried out between the parties. It is thus understood that the performance rating $I_P$ moves from the first state of implementation $P_1$ up to the second state of implementation $P_N$, moving through the intermediary states $P_2$ to $P_5$.

Figure 3:
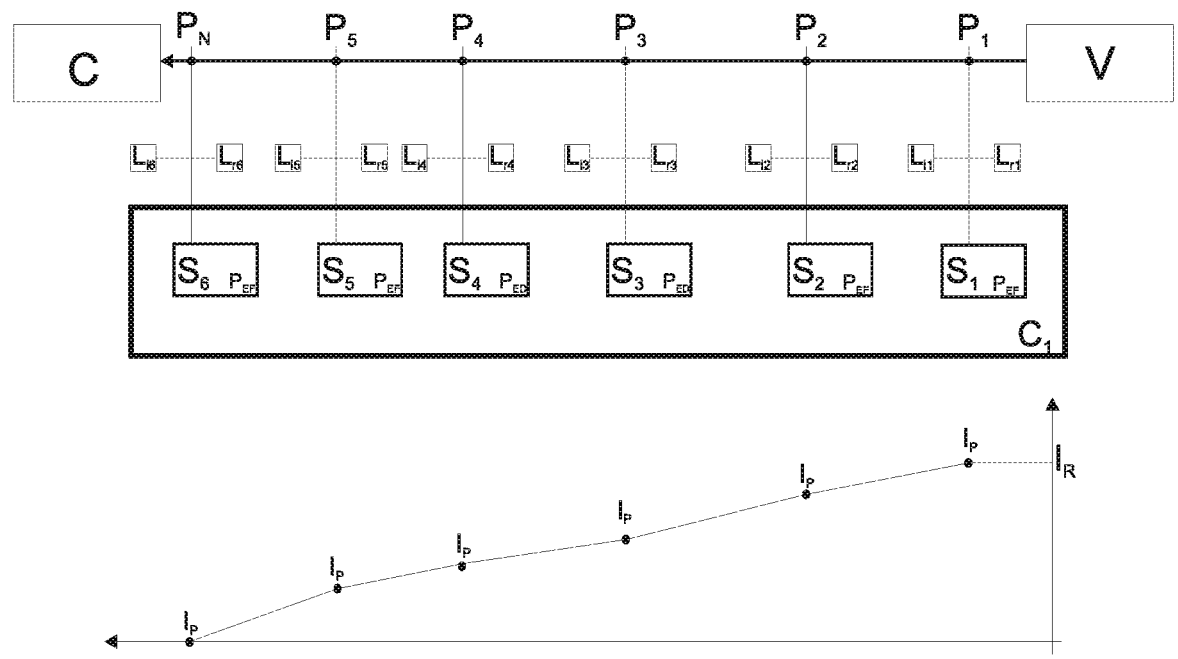
FIG. 3—is an additional block representation of one of the stages present in the methodology addressed in the present invention, indicating a generation of the chain of records as well as the generation and update of a score risk based on the displacement of a performance rating.

FIG. 3 indicates a representation of the update of the score risk $I_R$ based on the displacement of the performance rating $I_P$, where it is noted that the performance rating $I_P$ moves from $P_1$ to $P_N$ passing through $P_2$, $P_3$, $P_4$ and $P_5$. Specifically, it is understood that the nearer the performance rating $I_P$ is to its start point, that is, to the start of the action, the greater the score risk $I_R$ will be. Similarly, the nearer to the end of the action, the lower the score risk $I_R$ will be.

Besides the update of the score risk $I_R$ based on the expectation parameters (FIG. 2) and based on the displacement of the performance rating $I_P$ (FIG. 3), said score risk $I_R$ can be updated based on the comparison between the performance rating $I_P$ and the expectation parameters $P_E$, $P_{E1}$, $P_{E2}$, $P_{E3}$, $P_{E4}$, $P_{E5}$ . . . $P_{EN}$.

Figure 4:
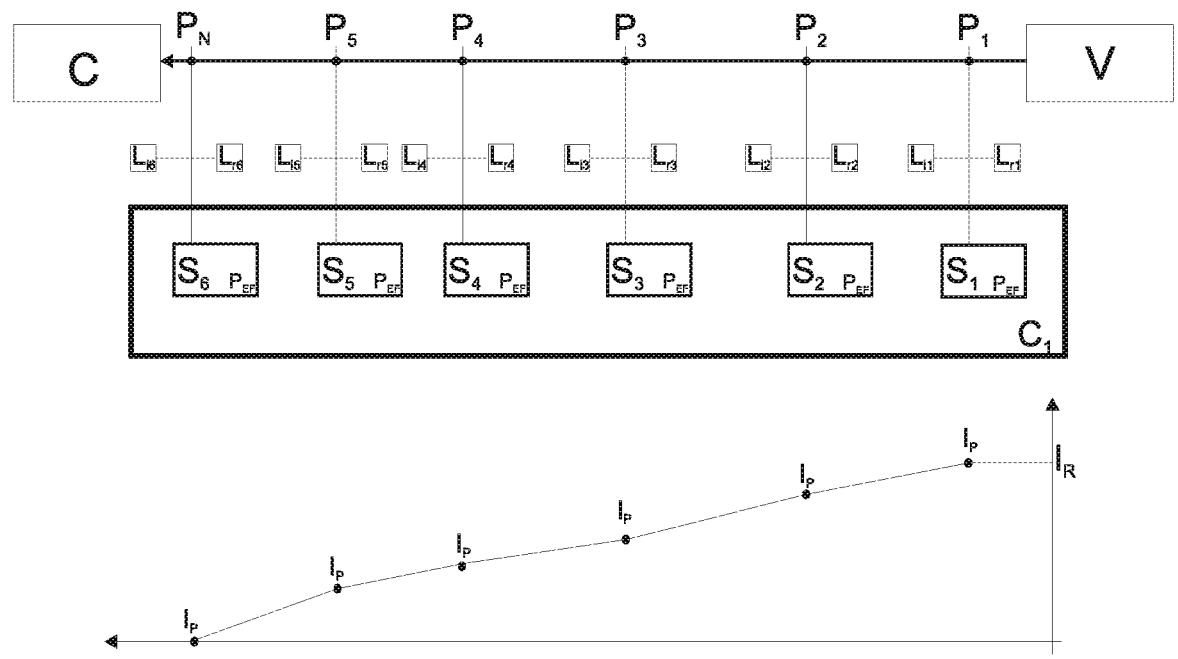
FIG. 4—is an additional block representation of one of the stages present in the methodology addressed in the present invention, indicating the generation of the chain of records as well as the generation and update of a score risk based on the displacement of a performance rating and also based on the expectation parameters.

The metrics used to update the score risk $I_R$ based on the comparison between the performance rating $I_P$ and the expectation parameters do not represent a limitative characteristic of the present invention. In any case, it is understood that in a scenario where the validation chain $C_1$ comprises solely favorable expectation parameters, the score risk tends to diminish jointly with the displacement of the performance rating $I_P$. In this sense, the score risk $I_R$ can be maximally reduced if the performance rating $I_P$ attains the second operating state $P_N$ and if the validation chain $C_1$ comprises solely favorable expectation parameters. Said hypothetical situation is represented in FIG. 4.

Additionally, and as mentioned previously, the score risk $I_R$ is reduced (lower risk) in the event of a favorable expectation parameter and incremented (higher risk) in the event of an unfavorable expectation parameter. Furthermore, it is proposed that in the event of an unfavorable expectation parameter, an evaluation should be made of the position of the performance rating $I_P$ so as then to decide on the increment level which will be given to the score risk $I_R$.

Similarly, in the event of a favorable expectation parameter, an evaluation should be made of the position of the performance rating $I_P$ so as then to decide on the reduction level which will be given to the score risk $I_R$.

In a non-limitative description, and based on the comparison of the performance rating $I_P$ with the expectation parameter, a decision can be made to update (increment or reduce) the score risk $I_R$ on a first updating level and on a second updating level.

In a merely hypothetical description, the first updating level refers to an update (increment/reduction) of 10% of the score risk $I_R$ and the second updating level refers to an increment/reduction (update) of 5% of the score risk $I_R$.

This is because in a fully valid embodiment of the present invention the nearer the performance rating $I_P$ is to the first state of implementation $P_1$ (start of the action) the greater the increment of the score risk $I_R$ will be in the event of an unfavorable expectation parameter $P_{ED}$. It is thus understood that in the event of an unfavorable expectation parameter $P_{ED}$, the score risk $I_R$ can be updated on the first level if the performance rating $I_P$ is nearer to the first state of implementation $P_1$ than to the second state of implementation $P_N$.

Similarly, the nearer the performance rating $I_P$ is to the second state of implementation $P_N$ (end of the action), the lower the increment of the score risk $I_R$ in the event of an unfavorable expectation parameter $P_{ED}$. It is thus understood that in the event of an unfavorable expectation parameter $P_{ED}$, the score risk $I_R$ can be updated on the second level if the performance rating $I_P$ is nearer to the second state of implementation $P_N$ than to the first state of implementation $P_1$.

In harmony with the description set out previously, the nearer the performance rating $I_P$ is to the first state of implementation $P_1$ (start of the action) the lower the reduction of the score risk $I_R$ in the event of a favorable expectation parameter $P_{EF}$. It is thus understood that in the event of a favorable expectation parameter $P_{EF}$, the score risk $I_R$ can be updated on the second level if the performance rating $I_P$ is nearer to the first state of implementation $P_1$ than to the second state of implementation $P_N$.

Similarly, the nearer the performance rating $I_P$ is to the second state of implementation $P_N$ (end of the action), the greater the reduction of the score risk $I_R$ in the event of a favorable expectation parameter $P_{EF}$. It is thus understood that in the event of a favorable expectation parameter $P_{EF}$, the score risk $I_R$ can be updated on the first level if the performance rating $I_P$ is nearer to the second state of implementation $P_N$ than to the first state of implementation $P_1$.

Figure 5:
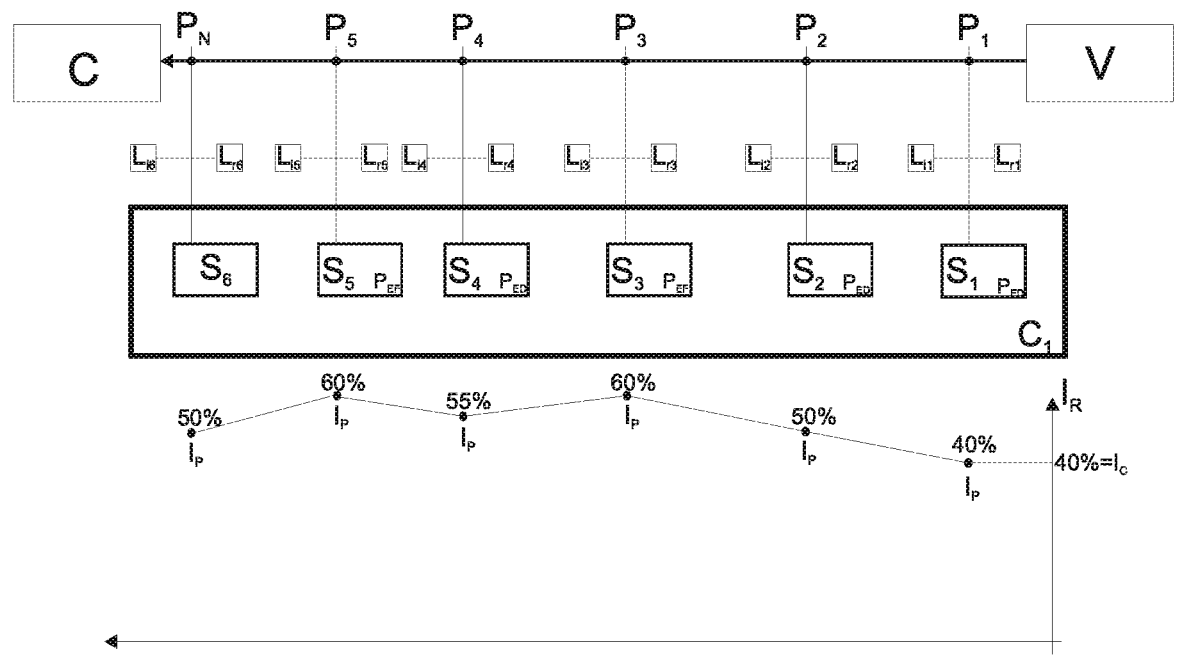
FIG. 5—is an additional block representation of one of the stages present in the methodology addressed in the present invention, indicating the generation of the chain of records as well as the generation and update of a score risk based on the displacement of a performance rating and also based on the expectation parameters.

Therefore, there is a hypothetical scenario wherein the score risk $I_R$ of an action carried out between the entities C and V begins at 40%, as represented in FIG. 5. In the first validation seal $S_1$, there is an unfavorable expectation right at the start of the action carried out between the parties, so there is an increment in the score risk $I_R$ on the first updating level, that is, the score risk $I_R$ attains the threshold of 50%.

In the second validation seal $S_2$, there is also an unfavorable expectation, so the evaluation of the performance rating $I_P$ reveals that it is nearer to the first state of implementation $P_1$. Therefore, the score risk $I_R$ is incremented at its first level, thus attaining the risk mark of 60%.

In $S_3$, the expectation became favorable and the analysis of the position of the performance rating $I_P$ reveals that said rating is also nearer to the first state of implementation $P_1$, so the score risk $I_R$ should be reduced to its second level, that is, 5%, moving to the level of 55%. In $S_4$, there is an unfavorable expectation, but the action is already nearing finalization, so the increment of the score risk $I_R$ occurs at its second level, returning to the level of 60%. In validating seal $S_5$, there is again a favorable expectation with the action nearing finalization, so the score risk $I_R$ is reduced to 50%.

Obviously, the values of the first and second updating levels should not be considered as limitative characteristics of the present invention, such that any other update value could be used.

Additionally, a perfectly valid metric to obtain the score risk $I_R$ consists of reducing the agreement risk value with the quantity of favorable expectation parameters $P_{EF}$ existing within the real transactional ballast $L_R$ and the validation chain $C_1$. It is thus understood that the higher the quantity of favorable expectation parameters $P_{EF}$ existing within a validation chain, the lower the score risk value $I_R$ will be. In other words, it is proposed that the score risk $I_R$ be inversely proportional to the quantity of favorable expectation parameters $P_{EF}$.

Similarly, the higher the quantity of unfavorable expectation parameters $P_{ED}$ existing within a validation chain, the higher the score risk $I_R$ will be.

An additional characteristic of the present invention lies in the fact that the score risk $I_R$ can be updated based on an initial reliability value $I_C$ (reliability index $I_C$) linked to at least one from among a first entity C and a second entity V. Therefore, the reliability index $I_C$ can be construed as an initial risk value of the entities C and V and obtained based on a record of risk ratings $I_R$ previously known to those entities.

In short, the reliability index $I_C$ can be obtained from the analysis of the validation seals $S_1$, $S_2$, $S_3$, $S_4$, $S_5$, $S_6$ ... $S_N$ and of the validation chain $C_1$ for actions previously carried out and that involve the entities C and V.

For example, and in reference to FIG. 5, there is knowledge from previously known validation chains that the score risk $I_R$ in actions where a second entity V is present is 40%. Therefore, when beginning a new analysis of the risks of a new action comprising a second entity V, the score risk $I_R$ of this new action can be initiated at 40%, as exemplified in FIG. 5. Obviously, chains of validations previously known that involve both the second entity V and the first entity C can be the basis for indicating an initial score risk for a new action.

Therefore, the initial score risk (reliability index $I_C$) can be evaluated considering not only the second entity V, but also considering a buying entity C, this is because certain selling entities V may behave a certain way with a first buyer, but behave differently with a second buyer, so by evaluating the two sides of the new action to be carried out (buyer and seller), the initial score risk can be determined for this new action.

It is thus understood that the teachings of the present invention enable a score risk $I_R$ to be obtained based on at least one from among the following factors: (i) comparison between the real markers $L_{R1}$, $L_{R2}$, $L_{R3}$, $L_{R4}$, $L_{R5}$ ... $L_{RN}$ and their respective ideal markers $L_{I1}$,$L_{I2}$,$L_{I3}$,$L_{I4}$,$L_{I5}$ ... $L_{IN}$, thus generating the expectation parameters, (ii) the displacement of the performance rating $I_P$, (iii) the risk values previously known of at least one from among the first entity C and the second entity V (reliability index $I_C$) as well as (iv) the combination between any one of the factors specified above.

It is understood from the above description that the comparison between the real markers $L_{R1}$, $L_{R2}$, $L_{R3}$, $L_{R4}$, $L_{R5}$ ... $L_{RN}$ and the ideal markers $L_{I1}$,$L_{I2}$,$L_{I3}$,$L_{I4}$,$L_{I5}$ ... $L_{IN}$ and consequent obtainment of the expectation parameters $P_{EF}$, $P_{ED}$ is the basis for updating the score risk $I_R$.

Therefore, further details are now provided on the proposed stage of comparison between the real and ideal markers as well as a valid form for generating the expectation parameters.

Figure 6:
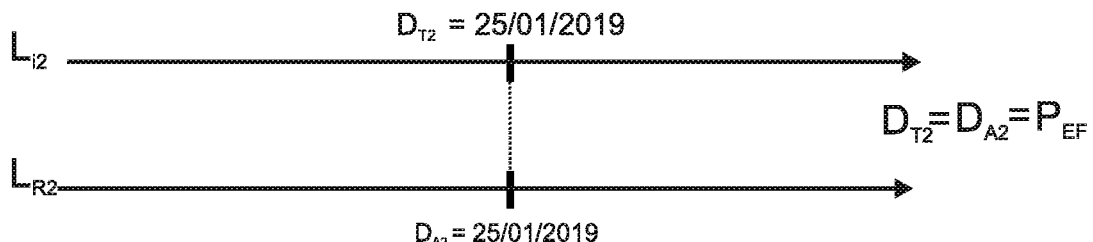
FIG. 6—is a representation of one of the stages contained in the methodology addressed in the present invention, indicating the comparison between the ideal markers and the real markers, wherein said markers refer to data markers
Figure 6:
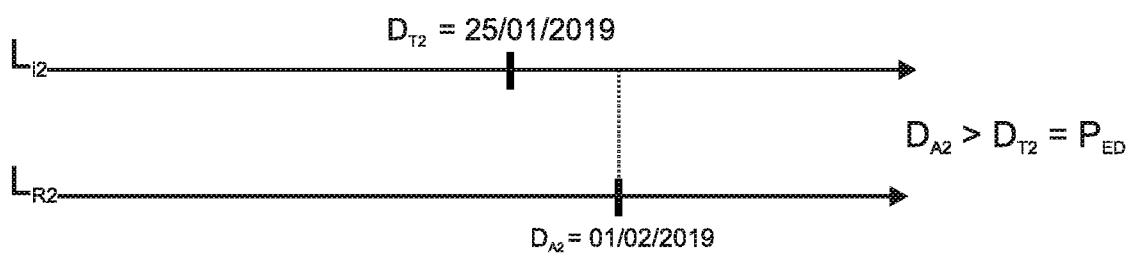
Figure 6:
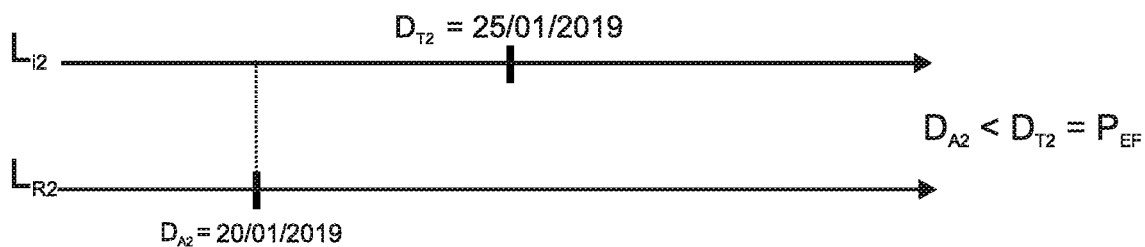

In reference to FIG. 6, it is considered that each one of the ideal markers $L_{I1}$,$L_{I2}$,$L_{I3}$,$L_{I4}$,$L_{I5}$ ... $L_{IN}$ comprises an ideal target datum $D_{T1}$,$D_{T2}$,$D_{T3}$,$D_{T4}$, ... $D_{TN}$. Therefore, in an example that considers the second ideal marker $L_{I2}$ as the estimated date for the product to be dispatched by the seller, the ideal target datum $D_{T2}$ of this marker may be considered, for example, as Jan. 25, 2019. It is emphasized that the ideal markers $L_{I1}$,$L_{I2}$,$L_{I3}$,$L_{I4}$,$L_{I5}$ ... $L_{IN}$ as well as each of their ideal target data are obtained based on the agreement A established between the entities C and V.

In harmony with the description made above, it is proposed that each one of the real markers $L_{R1}$, $L_{R2}$, $L_{R3}$, $L_{R4}$, $L_{R5}$ ... $L_{RN}$ comprises at least one real action datum $D_{A1}$, $D_{A2}$, $D_{A3}$, $D_{A4}$, $D_{A5}$, ... $D_{AN}$. Therefore, considering the second real marker $L_{R2}$ as the date wherein the product was effectively dispatched by the seller, said marker will comprise, for example, a real action datum $D_{A2}$ which may be considered, for example, as Jan. 25, 2019. It is thus understood that the real action datum $D_{A2}$ refers effectively to data where the product was dispatched by the seller.

Therefore, to obtain the expectation parameter $P_E$, it must be verified whether the real action data $D_{A1}$, $D_{A2}$, $D_{A3}$, $D_{A4}$, $D_{A5}$, ... $D_{AN}$ are in conformity with the ideal target data $D_{T1}$, $D_{T2}$,$D_{T3}$,$D_{T4}$, ... $D_{TN}$. In reference to the example illustrated in FIG. 6, a comparison must be made as to whether the ideal target datum $D_{T2}$ coincides with the real action datum $D_{A2}$. In other words, if must be verified whether the estimated date for the product to be dispatched by the seller $D_{T2}$ coincides with the date wherein effectively the product was dispatched, that is, it must be verified whether $D_{T2}$ is equal to $D_{A2}$.

If so, that is, if $D_{T2}$ is equal to $D_{A2}$, a favorable expectation parameter $P_{EF}$ is generated, as represented in FIG. 6(a).

In situations where the markers considered real/ideal refer to a date, as the delivery date, dispatch date, date of passage by specific fiscal barriers or geolocations, among others, it is important to consider that the occurrence of the action (real action datum) at a date subsequent to the one agreed upon (ideal target datum) ultimately generates an unfavorable expectation parameter $P_{ED}$. Said scenario is illustrated in FIG. 6(b).

In contrast, the occurrence of the action (real action datum) at a date prior to the one agreed upon (ideal target datum) ultimately generates a favorable expectation parameter, this is because, being a marker linked to a date, the occurrence of the action on a date prior to the one agreed upon tends to be beneficial for both the buyer and the seller, thus being beneficial so that the agreement between the entities is implemented (fulfilled). Said scenario is illustrated in FIG. 6(c).

It is thus understood that on the occasions where the ideal/real markers refer to a date, the following scenarios may be obtained:

(i) $D_{TN}$=$D_{AN}$=$P_{EF}$=there is conformity between real and agreed upon (FIG. 6(a));

(ii) $D_{TN}<D_{AN}=P_{ED}$=there is non-conformity between real and agreed upon (FIG. 6(b));

(iii) $D_{TN}>D_{AN}=P_{EF}$=there is conformity between real and agreed upon (FIG. 6(c));

Further, it must be underlined that by $D_{TN}<D_{AN}$, it is understood that the real action date $D_{AN}$ has occurred subsequently to the ideal target date $D_{TN}$, as represented in FIG. 6(b). In contrast, $D_{TN}>D_{AN}$ means that the real action date $D_{AN}$ has occurred prior to the ideal target date, as illustrated in FIG. 6(c).

Therefore, each of the ideal target data $D_{T1},D_{T2},D_{T3}, D_{T4}, \ldots D_{TN}$ must be compared with their respective real action datum for subsequent generation of the expectation parameter, latter being favorable or unfavorable.

It is thus understood that the comparison between the ideal and real markers enables the generation of the expectation parameter and consequent update of the score risk $I_R$. More specifically, a comparison is made as to whether the data agreed upon between the entities (ideal markers) are in conformity with the respective real data (real markers), that is, what was agreed upon is compared to what is effectively being fulfilled.

With the comparison between the ideal target data $D_{T1}, D_{T2},D_{T3},D_{T4}, \ldots D_{TN}$ and their respective real action datum $D_{A1}, D_{A2}, D_{A3}, D_{A4}, D_{A5}, \ldots D_{AN}$, it becomes possible, for example, to interfere with the transaction underway, as well as, principally, understanding which entity is responsible for a possible mismatch between the ideal target datum and the real action datum.

Therefore, the comparison between the ideal target datum and the real action datum acts not only on the score risk $I_R$ of the transaction which is underway between seller and buyer and enables the reliability index $I_C$ of the entity to be affected, that is, thus enabling the reliability of that entity for the performance of new transactions to be impacted.

Therefore, the teachings of the present invention enable the monitoring of the behavior of a given entity by way of the oscillations in the operations carried out, such that, by oscillations in the operations carried out it is understood as the comparison between each ideal target datum $D_{T1},D_{T2}, D_{T3},D_{T4}, \ldots D_{TN}$ and their respective real action datum $D_{A1}, D_{A2}, D_{A3}, D_{A4}, D_{A5}, \ldots D_{AN}$, thus generating the score risk $I_R$ linked to the operations of that entity.

It is emphasized that a given entity (buyer and/or seller) may act in several operations simultaneously, which it why it is advantageous to know the behavior of the entity, because if said entity is responsible for a non-conformity in an operation, said non-conformity will affect the score risk $I_R$ of the operation underway and may affect the score risk $I_R$ of new operations in which the entity is involved.

Furthermore, it is understood that each action carried out between the parties will comprise specific ideal and real data, for example, considering the action carried out between the entities C and V such as the supply of a product from the second entity V to the first entity C, said action may comprise the following ideal and real markers:

| Ideal markers | Real markers |
|---|---|
| Estimated date for initial payment by the buyer | Date on which the initial payment was carried out by the buyer |
| Estimated date for the product to be dispatched by the seller | Date on which the product was dispatched by the seller |
| Estimated date for receipt of the product by the buyer | Date on which the product was received by the buyer |

Besides markers connected to dates, other parameters (markers) can be considered for updating of the score risk are as follows: product dispatch event and comparison between fiscal documents, product dispatch event, product passage event through fiscal barriers or certain locations, product delivery confirmation event, product delivery conformity event, payment scheduling confirmation event and payment event. Said markers are referred to herein as conformity markers.

Just as the data markers, the conformity markers attest whether the action carried out between the entities is occurring as agreed upon based on the comparison between the real action data $D_{A1}, D_{A2}, D_{A3}, D_{A4}, D_{A5}, \ldots D_{AN}$ and the ideal target data $D_{T1},D_{T2},D_{T3},D_{T4}, \ldots D_{TN}$. Therefore, the conformity markers attest whether a certain expectation related to the action between the parties has happened (or not), so as to generate the favorable expectation parameter $P_{EF}$ (or unfavorable $P_{ED}$).

In short, it can be evaluated whether the merchandise (product) dispatch event is in fact occurring as agreed, accordingly, it is possible to compare the information available in fiscal documents, for example, comparing the information available in the transport tax document (CTe) with the information available in the sales invoice of the product.

Similarly, it is possible to compare whether the transport event of a product is in fact occurring as agreed upon by capturing information provided by transport companies and based on capturing information that indicates the passage of the product through fiscal barriers or certain specific locations (geolocations).

The product delivery confirmation event can be validated based on delivery confirmations furnished by both buyer and seller, basically, if both parties have confirmed the delivery, the score risk will be reduced. Alternatively, the score risk will be incremented if just one of the parties has confirmed the delivery.

Besides the information that the product was effectively delivered, the score risk can be updated based on the confirmation by buyer C that the product received is in conformity with what was purchased. Accordingly, it is incumbent upon the buyer to evaluate, for example, whether the quantity received of the product was the one effectively purchased and also whether the specifications of the product received are in agreement with the specifications requested.

The payment scheduling confirmation event tends to occur at the moment the buyer indicates that in fact the product was received, and also that the product received is in conformity with the product that was purchased. Therefore, the scheduling of the payment indicates an expectation of payment on the scheduled due date.

Further, and as mentioned previously, the delivery date of the product (and not only the confirmation of delivery) also represents a marker capable of updating the score risk.

Therefore, and considering the subject matter previously described, it is understood that the ideal and real markers can be segmented into two groups are as follows: data markers and conformity markers.

The data markers indicate whether the date occurred for a certain fact/event is in conformity with what was agreed upon, and the comparison between the ideal and real markers is the basis for determining the expectation parameter, as previously described and illustrated in FIG. 6. Basically, the response to the comparison between the data markers is: real has occurred exactly on the agreed-upon date (FIG. 6(a)), real has occurred after that agreed upon (FIG. 6(b)) or real has occurred prior to that agreed upon (FIG. 6(c)).

The conformity markers should be understood as those where the response is basically positive or negative, in which a positive response indicates that a certain expectation was met and consequently a favorable expectation parameter $P_{EF}$ should be generated.

Consequently, a negative response to a conformity marker indicates that a certain expectation was not met (that is, has not happened) and consequently an unfavorable expectation parameter $P_{ED}$ should be generated.

For example, it is considered that a certain conformity marker refers to the dispatch event of a product from the plant of the selling entity V. Said conformity marker is designed to indicate whether the information contained in the transport tax document (CTe) is in conformity with the information specified in the sales invoice of the product.

In this case, the transport tax document (CTe) should be understood as the conformity real marker, since said document comprises the information on the products that are effectively in transport. Further, the sales invoice of the product should be understood as a conformity ideal marker, since it comprises information on the products which were acquired by the buying entity C.

Therefore, said conformity marker relating to the dispatch event of the product may attest that a certain number specified in the transport tax document (CTe) is or is not in agreement with the numbering specified on the invoice of the product. In one non-limitative embodiment, said number may represent the code of the product, so if there is a difference (non-conformity) between the numbers (negative response), an unfavorable expectation parameter $P_{ED}$ is generated. On the other hand, if there is conformity between the numbers (positive response), a favorable expectation parameter $P_{EF}$ is generated.

In this case, it is understood that the code of the product specified in the transport tax document (CTe) and in the sales invoice of the product refer, respectively, to the real action datum $D_{A1}$ and to the ideal target datum $D_{T1}$.

Further, a certain real action datum $D_{A2}$ might refer to information specified in the transport tax document (CTe) and that indicates the quantity and/or weight of the products that are in transport. Therefore, its respective ideal target datum $D_{T2}$ should refer to the quantity and/or weight of the products that were effectively purchased by the first entity C.

Therefore, if there is conformity between the real action datum $D_{A2}$ and its respective ideal target datum $D_{T2}$, a positive conformity response will be obtained and will then be generated a favorable expectation parameter $P_{EF}$.

Basically, the methodology proposed in the present invention enables the comparison of any information (real datum) present in the transport tax document (CTe) with its respective information (ideal datum) present in the sales invoice of the product. In one non-limitative embodiment, said comparison may indicate whether the transport tax document (CTe) effectively comprises the Invoices which should be in transport. Accordingly, it is possible to compare, for example, any information (such as a numerical field) present in the CTe and in the Invoice. In a non-limitative manner, said numerical field may effectively refer to the number of the Invoice.

Additionally, a given conformity marker may attest whether a product has passed through a given geographical point, thus resulting in a positive response (the product has passed through said point) or a negative response (the product has not yet passed through said point). In this case, the real action datum $D_{A3}$ can be construed as a real location of the product and the ideal target datum $D_{T3}$ should be understood as a given location where there is an expectation of passage of the product acquired.

For example, it is known that the agreement A signed between the entities C and V indicates the expectation of passage of the product over the border between the states of São Paulo and Rio de Janeiro. Therefore, the ideal target datum $D_{T3}$ should be understood as the passage of the product over said border.

Based on the geographical location of the product in transport, that is, based on its real action datum $D_{A3}$, it is known that said product has not yet crossed said border. Therefore, there is a non-conformity between expectation (passing over the border) and reality (real location), that is, $D_{A3}$ is not in conformity with $D_{T3}$ ($D_{A3} \neq D_{T3}$). Therefore, a non-conformity response is obtained and consequently an unfavorable expectation parameter $P_{ED}$ is generated.

Alternatively, it is known from the geographical location of the product in transport that said product has already crossed said border, that is, there is conformity between reality and expectation ($D_{A3} = D_{T3}$) and that is beneficial for fulfilling the agreement A signed between the entities, so a positive conformity response is obtained and consequently a favorable expectation parameter $P_{EF}$ is generated.

Additionally, the agreement established between the entities C and V may indicate that a given product in transport from the selling entity V to the buying entity C has the expectation of cover at least 400 km per day, so the ideal target datum $D_{T4}$ refers to expectation of displacement of at least 400 km per day.

Based on the geographical location of the product in transport obtained, for example, at the start and end of a certain day, that is, based on its real action data $D_{A4}$, it is known that the product in question covered 450 km at the end of that day, that is, even if $D_{A4}$ is different to $D_{T4}$, interpreting the comparison between the real action datum $D_{A4}$ and the ideal target datum $D_{T4}$ is beneficial for fulfilling the agreement A established between the parties. Therefore, a favorable expectation parameter should be generated.

Similarly, and based on the geographical location of the product in transport obtained, for example, at the start and end of a certain day, that is, based on its real action data $D_{A4}$, it is known that product in question covered 350 km at the end of that day, that is, it is known that $D_{A4}$ is not in conformity with what was agreed upon ($D_{T4}$) and interpreting the comparison between the real action datum $D_{A4}$ and the ideal target datum $D_{T4}$ is detrimental to fulfilling the agreement A established between the parties. Therefore, an unfavorable expectation parameter $P_{ED}$ should be generated.

Further, a given conformity marker may attest whether the transport of the product passed through a given location on a specific date, thus resulting in a favorable expectation parameter $P_{EF}$ or unfavorable $P_{ED}$. Similarly to the example already mentioned, it is known that the agreement A signed between the entities C and V indicates the expectation of passage of the product over the border between the states of São Paulo and Rio de Janeiro prior to a specific date, for example, Mar. 15, 2019.

Therefore, the ideal target datum $D_{T5}$ should be understood as the passage of the product over the border prior to Mar. 15, 2019.

Based on the geographical location of the product in transport (geolocation), that is, based on its real action datum $D_{A5}$, it is noted that on Mar. 15, 2019 the product has not yet passed across said border, so there is non-conformity between reality ($D_{A5}$) and expectation ($D_{T5}$). Moreover, said non-conformity is detrimental to fulfilling the agreement A established between the parties, thus generating an unfavorable expectation parameter $P_{ED}$.

Alternatively, there is a scenario where on Mar. 13, 2019 the real action datum $D_{A5}$, that is, a geographical location of the product in transport indicates that said product has already crossed the border in question. In other words, the passage of the product across said physical barrier has occurred prior to the expected date. Therefore, there is conformity between the real action datum $D_{A5}$ and its respective ideal target datum $D_{T5}$, thus generating a favorable expectation parameter.

Similarly, a given conformity marker may attest whether the product was delivered, thus comprising a real action datum $D_{A6}$ that refers to real delivery of the product and an expectation datum (target) $D_{A6}$ that refers to an expectation that the product is delivered.

Therefore, obtaining the real action datum $D_{A6}$, for example, based on applications of geolocation, carriers and delivery tracking platforms indicates that the product was delivered, thus resulting in conformity between real and agreed upon and consequently generating the favorable expectation parameter $P_{EF}$.

Further, a given conformity marker $D_{A7}$ may attest whether the product was delivered with suitable specifications, that is, whether the product delivered is in agreement with what was purchased. In one example, a buying entity C acquiring 100 units of a product from a certain selling entity V has the expectation of receiving the 100 units. Therefore, the ideal target datum $D_{T7}$ represents the expectation that the 100 units are delivered by the selling entity V and consequently received by the buyer C.

However, the real action datum $D_{A7}$ indicates that only 90 units of the product were received by the buyer, so there is non-conformity between the real action datum $D_{A7}$ and the ideal target datum, that is, $D_{A7} \neq D_{T7}$, thus generating an unfavorable expectation parameter $P_{ED}$ and which tends to increment the score risk $I_R$ of that operation and affects the behavior of the selling entity V.

It is thus understood that for the conformity markers the comparison of the ideal target data $D_{T1}, D_{T2}, D_{T3}, D_{T4}, \ldots D_{TN}$ with the real action data $D_{A1}, D_{A2}, D_{A3}, D_{A4}, D_{A5} \ldots D_{AN}$ returns:

(i) $D_{TN} = D_{AN}$ = there is conformity between reality ($D_{AN}$) and expectation ($D_{TN}$) = positive conformity response = $P_{EF}$;
(ii) $D_{TN} \neq D_{AN}$ = there is non-conformity between reality ($D_{AN}$) and expectation ($D_{TN}$) = non-conformity response = $P_{ED}$;

Further, conformity between reality $D_{AN}$ and expectation $D_{TN}$ should be understood as being beneficial for implementing (fulfilling) the agreement signed between the parties, like the displacement of the product for 450 km in a single day whereas the expectation referred to a displacement of 400 km. Therefore, the "equation" $D_{TN} = D_{AN}$ should not be interpreted as "agreed upon is equal to real" or "450 is equal to 400", but rather as "agreed upon is in conformity with real" or "the displacement of 450 km is in conformity with that agreed upon".

Similarly, non-conformity between reality $D_{AN}$ and expectation $D_{TN}$ should be understood as detrimental for implementing (fulfilling) the agreement A between the parties, like the displacement of the product for 350 km in a single day whereas the expectation referred to a displacement of 400 km. Therefore, the "equation" $D_{TN} \neq D_{AN}$ should not be interpreted as "agreed upon is different to real" or "350 is different to 400", but rather as "agreed upon is in non-conformity with real" or "the displacement of 350 km is in non-conformity with that agreed upon".

Therefore, the methodology proposed in the present invention enables the generation and update of the score risk $I_R$ based on the comparison between the real markers and the ideal markers, whether they are data or conformity markers. Further, the methodology proposed enables the generation of a validation chain $C_1$ for the action carried out between the parties, wherein said validation chain $C_1$ groups all the validation seals $S_1 \ldots S_N$ (expectation parameters) generated for that action.

It is also underlined that a certain validation chain may comprise validation seals stemming from the comparison between the data markers and conformity markers.

Obviously, the use of the conformity and data markers indicated previously should not construe a limitative characteristic of the present invention, such that along general lines, the ideal and real markers can be considered as any parameter/factor/characteristic/event/data that indicates whether the real transactional ballast $L_R$ of the action carried out between the entities is in conformity with the ideal transactional ballast $L_I$ of the agreement signed between the parties, thus enabling the generation of a favorable or unfavorable expectation parameter.

Similarly, and considering the action carried out between the entities as a service provided by the second entity V for the first entity C, the ideal markers should be considered as information on what effectively the service hired (agreed) was, that is, the scope of the provision of service. In other words, what the obligations of the service provider were (performing the service hired) and those of the service taker (paying for the service provided and verifying whether it was done in conformity with that which was agreed upon). Therefore, the provision of service between two entities is usually consented by means of an agreement A, as a service provision contract signed between a selling party V and a buying party C.

In any case, agreement A between two entities should not compulsorily be understood as a contract, such that, any form of consent between two entities that expresses the parameters (markers) seen as ideal for the performance of said action may be understood as an agreement.

Therefore, the ideal/real markers may be considered as validation parameters that the service was started and finalized, including a confirmation from the contracting party (first entity C) that the service was carried out and that this is (or not) in conformity with the value agreed upon for the provision of the service and also whether the service carried out is in conformity with the scope of service which was hired (agreed).

Along general lines, the methodology proposed in the present invention enables an evaluation as to whether a service action is occurring (or has occurred) in conformity with what was agreed upon between the parties.

Therefore, and in a non-limitative manner, it is understood that for the performance of a service the following conformity markers may be considered: data/information present in the invoice for the service hired, confirmation that the service was provided, confirmation that the service provided is in agreement with what was contracted, payment scheduling for the service provided.

Therefore, for a service action, it is understood that the main markers to be considered will be the conformity markers, thus resulting in a positive response, that is, the performance of the service is in conformity with what was contracted, thus generating a favorable expectation parameter $P_{EF}$, or resulting in a negative response, indicating that the performance of the service is not in conformity with what was contracted, thus generating an unfavorable expectation parameter $P_{ED}$.

Obviously said characteristic does not refer to a limitative characteristic of the present invention, such that the data markers may perfectly be used to generate the expectation parameters and considering a service provision action. Similarly, for a service action provided between the parties, it is possible to generate validation chains $C_1$ that comprise validation seals $S_1 \ldots S_N$ obtained based both on conformity markers and data markers.

As service actions that are able to absorb the teachings of the present invention, the following can be cited: logistics services, facilities services, streaming services contracting (audio/video), between other. Obviously, the performance of said services should not be considered as a limitative characteristic of the present invention, such that, any service action agreed upon between two entities would be able to absorb the methodology proposed in the present invention.

Considering the representation of FIG. 1, and any that is the type of action provided between the entities (service performance or product supply) it is proposed that the ideal markers $L_{I1}, L_{I2}, L_{I3}, L_{I4}, L_{I5} \ldots L_{IN}$ be obtained directly from the agreement A signed between the entities C and V.

In relation to the real markers $L_{R1}, L_{R2}, L_{R3}, L_{R4}, L_{R5} \ldots L_{RN}$, a valid embodiment of the present invention proposes that they are preferably captured from third party entities $E, E_1, E_2 \ldots E_N$ (entities that are linked neither to the first entity C nor to the second entity V), as, for example, logistics operators.

Therefore, the methodology proposed in the present invention is able to capture, preferably by means of APIs (Application Programming Interface) the real markers $L_{R1}, L_{R2}, L_{R3}, L_{R4}, L_{R5} \ldots L_{RN}$ and then compare them, in real time, with the ideal markers $L_{I1}, L_{I2}, L_{I3}, L_{I4}, L_{I5} \ldots L_{IN}$.

It is emphasized that third party entities $E, E_1, E_2 \ldots E_N$ are intended to mean any public platform that can be accessed and that allows the capture of information (real markers) related to the performance of the action between the parties. In one embodiment, said real markers $L_{R1}, L_{R2}, L_{R3}, L_{R4}, L_{R5} \ldots L_{RN}$ can be inserted into the public platform by the very entities C and V and then captured in accordance with the teachings of the present invention. It is thus understood that the public platforms can be fed by the very entities C and V, but said platforms can be linked to the first entity C and the second entity V.

Therefore, it is proposed that the real markers $L_{R1}, L_{R2}, L_{R3}, L_{R4}, L_{R5} \ldots L_{RN}$ be captured directly from the public platforms of third party entities $E, E_1, E_2 \ldots E_N$, and not captured directly from one of entities C and V.

With said characteristic, it becomes possible, for example, for a credit institution IC to obtain from the public platforms of third party entities $E, E_1, E_2 \ldots E_N$ the real markers $L_{R1}, L_{R2}, L_{R3}, L_{R4}, L_{R5} \ldots L_{RN}$ and then compare them to the information seen as ideal $L_{I1}, L_{I2}, L_{I3}, L_{I4}, L_{I5} \ldots L_{IN}$, thus generating the score risk $I_R$ of the action carried out between the entities C and V.

The importance and advantage of capturing the real markers $L_{R1}, L_{R2}, L_{R3}, L_{R4}, L_{R5} \ldots L_{RN}$ from third party entities and not directly from the first entity C and/or from the second entity V lies in the fact that it avoids the capture of false, disconnected information furnished by the first entity C and/or second entity V. In just one example, it is common scenario for an entity (such as a second entity V) to inform that a product was dispatched, when in truth said action has not occurred. With the capture of the real data $L_{R1}, L_{R2}, L_{R3}, L_{R4}, L_{R5} \ldots L_{RN}$ from third party entities said fact is avoided, whereby increasing the assertiveness in calculating the score risk $I_R$.

In a non-limitative example, said third party entities could be at least one from among: platforms (applications) of geolocation, carriers, government information, delivery confirmation platforms and third party systems used by the companies.

In any case, and if it is not possible to capture the data $L_{R1}, L_{R2}, L_{R3}, L_{R4}, L_{R5} \ldots L_{RN}$ from third party entities E, $E_1, E_2 \ldots E_N$, there is nothing to prevent said real data $L_{R1}, L_{R2}, L_{R3}, L_{R4}, L_{R5} \ldots L_{RN}$ from being captured directly from the buying entity C and/or from the selling entity V.

As an additional characteristic of the present invention, and in reference to FIG. 1, there is further proposed a method for liquidating an asset (DC). In this sense, a purchase order for the asset DC is issued by the second entity V to the credit institution IC, so when acquiring the asset DC, it is up to the credit institution IC to afford the amounts of the action agreed upon between the second entity V and the first entity C. Subsequently, the first entity C should liquidate the operation, that is, to make the payment for the credit institution IC.

It so happens that in some situations certain entities (such as the first entity C) do not accept third parties involved in credit operations, so even though the asset DC should be paid to the credit institution IC, the first entity C ultimately liquidates the operation directly with the second entity V.

In a valid embodiment of the present invention, it is proposed that the second entity V be customized to automatically send the amounts tied to the liquidation of the action to the credit institution IC.

Accordingly, and as represented in FIG. 1, it is proposed that the second entity be associated to a digital portfolio CD, in upon issuing the purchase order of the asset DC to the credit institution, said order will also comprise a first set of data (information) A1, such that said first set of data A1 comprises data relating to said digital portfolio CD as well as data relating to the credit institution IC which acquired the asset DC in addition to data relating to the entities involved in the action, that is, the first entity C and the second entity V. It is proposed that the first set of data A1 should also comprise information relating to the action which is carried out between the entities.

Therefore, at the time when the operation is liquidated by the first entity C, latter will make said liquidation in the digital portfolio CD and this will automatically relay said liquidation to the credit institution IC. Basically, upon liquidating the operation, the first entity sends to the digital portfolio CD a second set of data B which also comprises information relating to the action carried out between the entities C and V. Therefore, it is up to the digital portfolio CD to evaluate whether the second set of data B is equivalent to the first set of data A1, that is, the digital portfolio CD must evaluate whether the value liquidated relates to the credit DC previously acquired by the institution IC and relating to that specific action, such that, if so, the digital portfolio CD automatically relays the liquidation to the credit institution IC.

In a fully valid embodiment of the present invention, it is proposed that the first entity C also be associated to a digital portfolio CD. In this embodiment, the liquidation of the operation may be automatically carried out by verifying the information contained in the validation chain $C_1$.

In other words, said digital portfolio CD of the first entity C may be customized to automatically liquidate the operation only if certain conditions of the validation chain $C_1$ have been met. In a non-limitative example, it is proposed that said conditions be linked to at least one from among the following factors: the quantity of favorable/unfavorable expectation parameters, performance rating $I_P$, values of the score risk $I_R$ as well as a combination of any one from among said factors.

Figure 7:
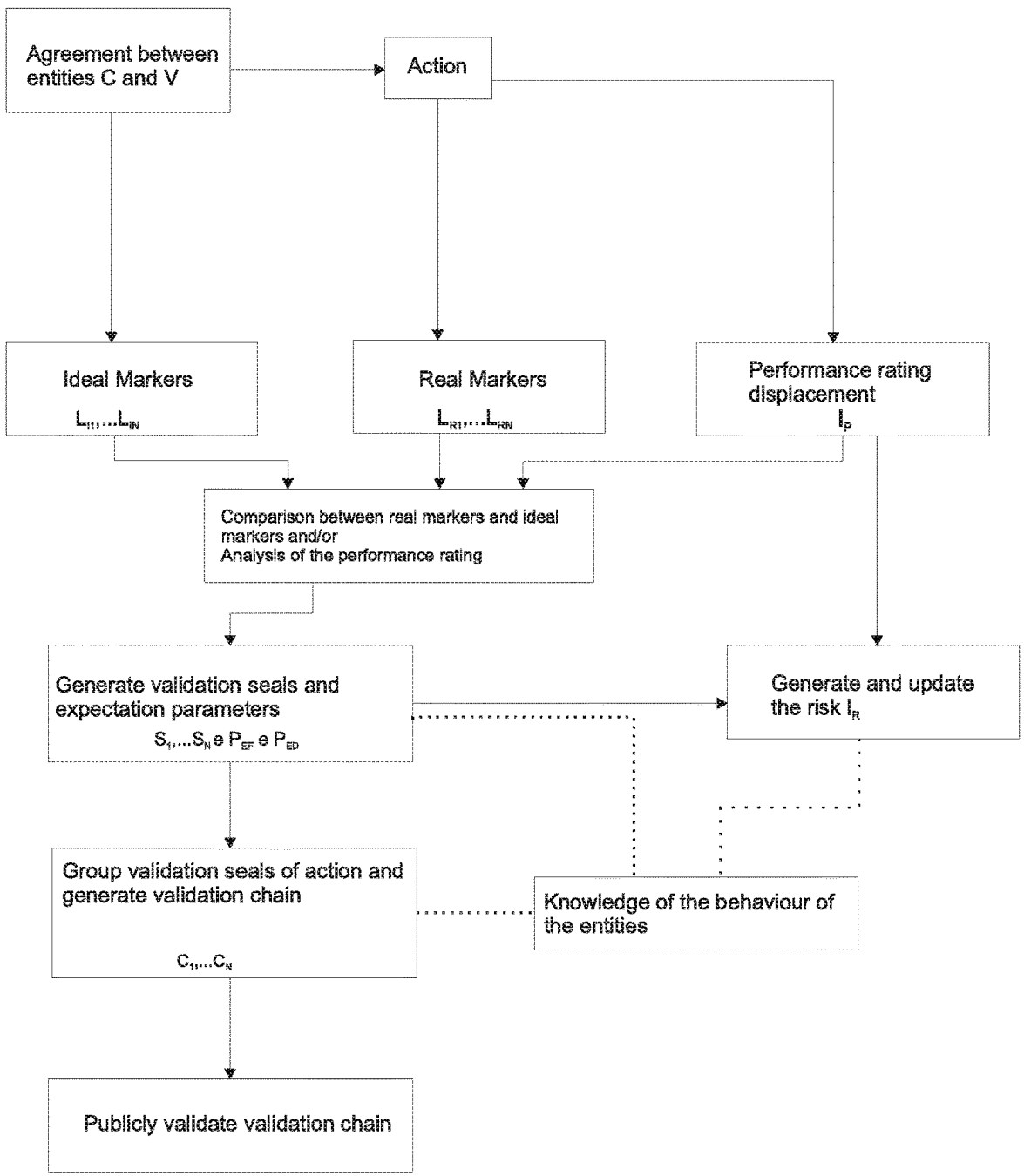
FIG. 7—is a block representation indicating integral stages of the methodology proposed in the present invention.

FIG. 7 presents a simplified block representation and illustrates the stages appearing in the methodology addressed in the present invention. In short, an agreement is established between a first entity C and a second entity V for the performance of a certain action, where said agreement establishes the obligations of each of the entities C and V for the performance of the action. Said obligations are referred to as ideal markers $L_{I1}, L_{I2}, L_{I3}, L_{I4}, L_{I5} \ldots L_{IN}$. The effective performance of the action generates a plurality of real markers $L_{R1}, L_{R2}, L_{R3}, L_{R4}, L_{R5} \ldots L_{RN}$.

Once the agreement is established, a certain asset DC is offered by the selling entity V to a credit institution IC, such that the credit institution IC, in possession of the methodology presented in the present invention, thereafter compares each one of the ideal markers $L_{I1}, L_{I2}, L_{I3}, L_{I4}, L_{I5} \ldots L_{IN}$ to their respective real markers $L_{R1}, L_{R2}, L_{R3}, L_{R4}, L_{R5} \ldots L_{RN}$.

The comparison between each one of the ideal markers $L_{I1}, L_{I2}, L_{I3}, L_{I4}, L_{I5} \ldots L_{IN}$ to their respective real markers $L_{R1}, L_{R2}, L_{R3}, L_{R4}, L_{R5} \ldots L_{RN}$ occurs as and when the action is carried out between the parties, that is, as and when the performance rating $I_P$ moves from its start point to its end point.

Further, the comparison between the ideal markers and their respective real markers enables the generation of validation seals $S_1, S_2, S_3, S_4, S_5 \ldots S_N$, wherein each validation seal will indicate a status of the comparison between the ideal and real markers. In short, said status may assume a status of conformity (favorable) or non-conformity (unfavorable). Said status indicates an expectation (expectation parameter ($P_{EF}$, $P_{ED}$)) of success in implementing the action made between the entities.

The methodology proposed in the present invention further enables the credit institution IC to group all the validation seals $S_1, S_2, S_3, S_4, S_5 \ldots S_N$ of a certain action, thus generating the so-called validation chain $C_1$ of the action in question. It is thus understood that each action will comprise a single validation chain, such that each validation chain will comprise a plurality of validation seals.

In one proposal, the validation chains $C_1, C_2, \ldots C_N$ are created in a private environment, that is, the environment of the very credit institution. Furthermore, it is proposed that said validation chains $C_1, C_2, \ldots C_N$ may be validated in a public environment, preferably by way of the technology known as blockchain.

Further, the generation of the validation seals $S_1, S_2, \ldots S_N$ as well as the expectation parameters $P_{EF}$, $P_{ED}$ enables the generation of a score risk $I_R$. In short, the score risk $I_R$ refers to a score that enables real-time evaluation of the risks involved in the action underway between the entities C and V. Said score risk $I_R$ may be visualized in real time by the institution IC, thus evaluating the risks of the transaction between the entities. In one embodiment, the score risk $I_R$ may be displayed on an indication element of the credit institution, such as a monitor or any electronic equipment. The same applies to the validation seals and to the validation chain. Further, a warning may be issued for the institution IC if the score risk $I_R$ is below a defined limit (critical score risk $I_{RC}$).

Besides the advantage relating to the generation and to the real-time update of the score risk $I_R$, an additional advantage of the teachings of the present invention lies in the fact that the generation of the validation seals $S_1, S_2, \ldots S_N$ as well as validation chains $C_1, C_2, \ldots C_N$ enables the credit institution IC to evaluate the behavior of each entity, whereby facilitating decision-making relating to the acquisition of new assets in actions involving each of the entities C and V.

The present invention further describes a computer system for generating a score risk in harmony with the description set out previously.

In short, the present invention describes a computer system for generating a score risk $I_R$ through a communications network, the system comprising means for receiving at least one purchase order for at least one asset DC, the purchase order of the asset DC generated from an agreement A established between a first entity C and a second entity V, the agreement linked to the performance of an action between the entities C,V.

Wherein the system further comprises means for obtaining an ideal transactional ballast $L_I$, the ideal transactional ballast $L_I$ comprising a plurality of ideal markers $L_{I1}, L_{I2}, L_{I3}, L_{I4}, L_{I5} \ldots L_{IN}$ wherein each one of the ideal markers $L_{I1}, L_{I2}, L_{I3}, L_{I4}, L_{I5} \ldots L_{IN}$ is related to the agreement A established between the entities C,V, the system further comprising means for obtaining a real transactional ballast $L_R$, the real transactional ballast $L_R$ comprising a plurality of real markers $L_{R1}, L_{R2}, L_{R3}, L_{R4}, L_{R5} \ldots L_{RN}$, wherein each one of the real markers $L_{R1}, L_{R2}, L_{R3}, L_{R4}, L_{R5} \ldots L_{RN}$ is related to the action carried out between the entities C,V.

Wherein the system further comprises means for generating and updating the score risk $I_R$ based on the comparison between the real markers $L_{R1}, L_{R2}, L_{R3}, L_{R4}, L_{R5} \ldots L_{RN}$ and the ideal markers $L_{I1}, L_{I2}, L_{I3}, L_{I4}, L_{I5} \ldots L_{IN}$.

The present invention further describes a non-transitory computer-readable storage media configured to have computer-executable stored instructions which, when executed by a processor, make a computer system carry out the teachings described in the present invention.

There is further described a system comprising one or more processors, one or more memories associated to the processors and comprising instructions executable by the processors, such that the processors are configured to execute the instructions and carry out a method as described and/or defined in the present invention.

It is also understood that the description carried out for incrementing/reducing the score risk $I_R$ should not be considered as a limitation of the present invention, such that, in fully valid embodiments of the present invention, said score risk might represent a success rating relating to the action carried out between the entities. In this case, the generation and update of the success rating might occur oppositely to that previously described.

Having described an example of a preferred embodiment, it should be understood that the scope of the present invention covers other possible variations, being limited solely by the content of the accompanying claims, potential equivalents being included therein.

The invention claimed is:

1. A computer-implemented method for generating a score risk, the method comprising the steps of:
receiving, by way of a communications network, at least one purchase order for at least one asset, the purchase order of the at least one asset generated from at least one agreement established between a first entity and a second entity, the agreement linked to performance of one or more actions between the first and second entities, including actions that can be performed simultaneously, each one of the one or more actions being carried out between the entities being delimited by at least a first state of implementation and at least a second state of implementation, wherein the purchase order is acquired by a credit institution from the second entity, capturing, via at least one processor, a plurality of ideal markers contained within an ideal transactional ballast generated based on the at least one agreement, each of the plurality of ideal markers being related to one or more parameters within the at least one agreement, automatically capturing a plurality of real markers, the plurality of real markers being captured via the at least one processor accessing, in a real time manner during the performance of each of the one or more actions between the first and second entities, a platform of at least one third entity, wherein the at least one third entity is an entity independent and separate from both the first and second entities, and wherein the plurality of real markers are contained within a real transactional ballast generated based on the performance of each of the one or more actions between the first and second entities, each of the plurality of real markers being related to the performance of each of the one or more actions between the first and second entities, automatically comparing, in a real time manner with the performance of the one or more actions between the first and second entities and via the at least one processor, the real markers captured from the platform of the at least one third entity and the ideal markers, automatically generating, in a real time manner with the performance of the one or more actions between the first and second entities and via the at least one processor, at least one validation seal based on the comparison between the real markers captured from the platform of the at least one third entity and the ideal markers, wherein each validation seal comprises a favorable or unfavorable expectation parameter, automatically generating, via the at least one processor, a validation chain from the grouping of the validation seals, wherein each action carried out between the first and second entities generates a validation chain, generating and updating, in real time with the performance of each of the one or more actions between the first and second entities and via the at least one processor, the score risk, the generating and updating being based on the at least one processor performing a comparison between the real markers and the ideal markers and also based on at least the generated validation seal(s) containing the generated expectation parameter(s), upon acquisition of the asset by the credit institution, via the at least one processor and in a real time manner with the performance of the one or more actions between the entities, automatically generating and displaying in a private environment accessible to only the credit institution via an indication element thereof, the score risk, the validation seals comprising the favorable or unfavorable expectation parameter, and the validation chain for each action carried out between the first and second entities, wherein:

the step of automatically generating and displaying the score risk, the validation seals with the favorable or unfavorable expectation parameter and the validation chain in the private environment is also automatically performed by the processor for a plurality of actions being carried out simultaneously between the first entity and the second entity, wherein each action carried out simultaneously between the entities generates the score risk, the validation seal and the validation chain for the action, the validation seals are automatically displayed and updated in the indication element of the credit institution, in a real time manner with the performance of each one of the actions between the first and second entities, thereby indicating to the credit institution that each one of the actions is occurring, the favorable or unfavorable expectation parameters are automatically displayed and updated in the indication element of the credit institution, in a real time manner with the performance of each one of the actions between the first and second entities, thereby indicating to the credit institution an expectation of success in implementing each one of the actions agreed between the first entity and the second entity, and the validation chain is automatically displayed and updated in the indication element of the credit institution, in a real time manner with the performance of each one of the actions between the first and second entities, thereby indicating to the credit institution how the first and second entities behaved during the action represented by the validation chain, generating, via the at least one processor, a reliability index linked to at least one from among the first entity and the second entity, wherein the reliability index is generated from the analysis of each of the validation chains for actions carried out with the first entity and/or with the second entity, evaluating the reliability index when receiving, by way of a communications network, a new purchase order for at least one new asset involving at least one of the first entity or the second entity, and generating, via the at least one processor, the score risk for the new purchase order based at least on the reliability index.

2. The method according to claim 1, wherein each validation seal is generated a single time only and the validation seals are unalterable.

3. The method according to claim 2, further comprising the step of:

validating the validation chain in a public environment.

4. The method according to claim 3, wherein validating the validation chain is by blockchain.

5. The method according to claim 4, further comprising the steps of:

capturing the ideal markers based on the agreement established between the entities, and capturing the real markers of at least one from among the third entity, the first entity and the second entity.

6. The method according to claim 5, wherein the comparison between the real markers and the ideal markers further comprises the steps of:

validating each one of the real markers with their respective ideal markers, generating the favorable or unfavorable expectation parameter based on the validation between each one of the real markers and their respective ideal markers, displacing a performance rating based on each of the favorable or unfavorable expectation parameter generated, and updating the score risk ($I_R$) based on at least one from among the displacement of the performance rating ($I_P$)

and each one of the favorable or unfavorable expectation parameters($P_E$, $P_{E1}$, $P_{E2}$, $P_{E3}$, $P_{E4}$, $P_{E5}$, ... $P_{EN}$)generated.

7. The method according to claim 6, wherein:
each one of the ideal markers comprises an ideal target datum and each one of the real markers comprises at least one real action datum, and
the step of validating each one of the real markers with each one of the ideal markers further comprises the steps of:
verifying whether the real action data are in conformity with the ideal target data, and
generating each one of the favorable or unfavorable expectation parameters based on the verification of the real action data with the ideal target data.

8. The method according to claim 7, wherein:
the ideal markers and the real markers are configured as data markers and conformity markers, such that for the data markers, the step of verifying whether the real action data are in conformity with the ideal target data further comprises the steps of:
verifying whether the real action datum is equal to the ideal target datum,
verifying whether the real action datum is subsequent to the ideal target datum, and
verifying whether the real action datum is prior to the ideal target datum.

9. The method according to claim 8, further comprising at least one of:
generating the favorable expectation parameter when the real action datum is equal to the ideal target datum or when the real action datum is prior to the ideal target datum, or
generating the unfavorable expectation parameter when the real action datum is subsequent to the ideal target datum.

10. The method according to claim 8, wherein, for the conformity markers, the step of verifying whether the real action data are in conformity with the ideal target data further comprises the steps of:
comparing the real action data with the ideal target data, and
interpreting the comparison between the real action data with the ideal target data, and
alternatively:
when the real action data are in conformity with the ideal target data, perform the further steps of generating a positive conformity response and the favorable expectation parameter, or
when the real action data are not in conformity with the ideal target data, perform the further steps of generating a non-conformity response and the unfavorable expectation parameter.

11. The method according to claim 10, wherein:
the conformity between the real action data and the ideal target data is beneficial so that the agreement between the first and second entities is implemented, and
the non-conformity between the real action data and the ideal target data is detrimental so that the agreement between the first and second entities is implemented.

12. The method according to claim 10, further comprising at least one of:
incrementing the score risk if the unfavorable expectation parameter is generated, or
reducing the score risk if the favorable expectation parameter is generated.

13. The method according to claim 12, further comprising the step of updating the score risk based on the comparison between the performance rating and the favorable or unfavorable expectation parameters.

14. The method according to claim 13, further comprising the step of updating the score risk on a first updating level or on a second updating level based on the comparison between the performance rating and the favorable or unfavorable expectation parameters.

15. The method according to claim 14, further comprising the steps of:
updating the score risk on the first updating level in the event of generation of the unfavorable expectation parameter and if the performance rating is nearer the first state of implementation than to the second state of implementation, and
updating the score risk on the second updating level in the event of generation of the unfavorable expectation parameter and if the performance rating is nearer to the second state of implementation than to the first state of implementation.

16. The method according to claim 15, further comprising the steps of:
updating the score risk on the second updating level in the event of generation of the favorable expectation parameter and when if the performance rating is nearer the first state of implementation than to the second state of implementation, and
updating the score risk on the first updating level in the event of generation of the favorable expectation parameter and when the performance rating is nearer to the second state of implementation than to the first state of implementation.

17. The method according to claim 15, wherein the first updating level updates the score risk in a higher amount than the amount of the second updating level.

18. The method according to claim 17, wherein the score risk is reversely proportional to a quantity of the favorable expectation parameters existing within the validation chain.

19. The method according to claim 18, further comprising the step of maximally reducing the score risk when the performance rating attains the second operating state of implementation and the validation chain comprises solely the favorable expectation parameters.

20. The method according to claim 19, further comprising a step of issuing a warning to the credit institution if the score risk is below a critical score risk.

21. A computer system for generating a score risk, the system comprising:
one or more memory storage units connected to a communications network; and
one or more processors configured for:
receiving, by way of the communications network, at least one purchase order for at least one asset, the purchase order of the at least one asset generated from at least one agreement established between a first entity and a second entity, the agreement linked to performance of one or more actions between the first and second entities, including actions that can be performed simultaneously, each one of the one or more actions being carried out between the entities being delimited by at least a first state of implementation and at least a second state of implementation, wherein the purchase order is acquired by a credit institution from the second entity,
capturing a plurality of ideal markers contained within an ideal transactional ballast, the ideal transactional ballast being generated based on the at least one agreement, wherein each one of the ideal markers is related to one or more parameters within the at least one agreement established between the first and second entities, automatically capturing, by accessing a platform of at least one third entity in a real time manner during the performance of each of the one or more actions between the first and second entities, a plurality of ideal markers contained within a real transactional ballast, the real transactional ballast comprising a plurality of real markers, wherein each one of the real markers is related to the action carried out between the entities, wherein the at least one third entity is independent and separate from both the first and second entities, automatically comparing, in a real time manner with the performance of the one or more actions between the first and second entities, the real markers and the ideal markers, automatically generating, in a real time manner with the performance of the one or more actions between the first and second entities, at least one validation seal based on the comparison between the real markers captured from the platform of the at least one third entity and the ideal markers, wherein each validation seal comprises a favorable or unfavorable expectation parameter, automatically generating a validation chain from the grouping of the validation seals, wherein each action carried out between the first and second entities generates a validation chain, generating and updating, in real time with the performance of each of the one or more actions between the first and second entities, the score risk, the generating and updating being based on the comparison performed between the real and the ideal markers and also based on at least the generated validation seal(s) containing the generated favorable or unfavorable expectation parameter(s), upon acquisition of the asset by the credit institution, automatically generating and displaying, in a real time manner with the performance of the one or more actions between the entities and in a private environment accessible to only the credit institution via an indication element thereof: the score risk, the validation seals comprising the favorable or unfavorable expectation parameter, and the validation chain for each action carried out between the first and second entities, wherein the step of automatically generating and displaying the score risk, the validation seals with the favorable or unfavorable expectation parameter and the validation chain in the private environment is also automatically performed by the processor for a plurality of actions being carried out simultaneously between the first entity and the second entity, wherein each action carried out simultaneously between the entities generates the score risk, the validation seal and the validation chain for the action, wherein the validation seals are automatically displayed and updated in the indication element of the credit institution, in a real time manner with the performance of each one of the actions between the first and second entities, thereby indicating to the credit institution that each one of the actions is occurring, wherein the favorable or unfavorable expectation parameters are automatically displayed and updated in the indication element of the credit institution, in a real time manner with the performance of each one of the actions between the first and second entities, thereby indicating to the credit institution an expectation of success in implementing each one of the actions agreed between the first entity and the second entity, and wherein the validation chain is automatically displayed and updated in the indication element of the credit institution, in a real time manner with the performance of each one of the actions between the first and second entities, thereby indicating to the credit institution how the first and second entities behaved during the action represented by the validation chain, generating a reliability index linked to at least one from among the first entity and the second entity, wherein the reliability index is generated from the analysis of each of the validation chains for actions carried out with the first entity and/or with the second entity, evaluating the reliability index when receiving, by way of the communications network, a new purchase order for at least one new asset involving at least one of the first entity or the second entity, and generating the score risk for the new purchase order based at least on the reliability index.

22. A non-transitory computer-readable storage media having stored therein instructions executable on a computer which, when executed by a processer, make a computer system to:

receive, by way of a communications network, at least one purchase order for at least one asset, the purchase order of the at least one asset generated from at least one agreement established between a first entity and a second entity, the agreement linked to performance of one or more actions between the first and second entities, including actions that can be performed simultaneously, each one of the one or more actions being carried out between the entities being delimited by at least a first state of implementation and at least a second state of implementation, wherein the purchase order is acquired by a credit institution from the second entity, capture, via execution of the processor, a plurality of ideal markers contained within an ideal transactional ballast generated based on the at least one agreement established between the first and second entities, each of the plurality of ideal markers being related to one or more parameters within the at least one agreement, automatically capture a plurality of real markers by accessing, in a real time manner during the performance of each of the one or more actions between the first and second entities, a platform of at least one third entity, wherein the at least one third entity is an entity independent and separate from both the first and second entities, and wherein each one of the real markers is related to the performance of each of the one or more actions carried out between the first and second entities, automatically compare, via execution of the processor and in a real time manner with the performance of the one or more actions between the first and second entities, the real markers captured from the platform of the at least one third entity and the ideal markers, automatically generate, via execution of the processor and in a real time manner with the performance of the one or more actions between the first and second entities, at least one validation seal based on the comparison between the real markers captured from the platform of the at least one third entity and the ideal markers, wherein each validation seal comprises a favorable or unfavorable expectation parameter, automatically generate, via execution of the processor, a validation chain from the grouping of the validation seals, wherein each action carried out between the first and second entities generates a validation chain, and generate and update, via execution of the at least one processor and in real time with the performance of each of the one or more actions between the first and second entities, a score risk, the generating and updating being based on the comparison performed between the real markers and the ideal markers and also based on at least the generated validation seal(s) containing the generated favorable or unfavorable expectation parameter(s), upon acquisition of the asset by the credit institution, via execution of the at least one processor and in a real time manner with the performance of the one or more actions between the entities, automatically generate and display in a private environment accessible to only the credit institution via an indication element thereof, the score risk, the validation seals comprising the favorable or unfavorable expectation parameter, and the validation chain for each action carried out between the first and second entities, wherein the step of automatically generating and displaying the score risk, the validation seals with the favorable or unfavorable expectation parameter and the validation chain in the private environment is also automatically performed by the processor for a plurality of actions being carried out simultaneously between the first entity and the second entity, wherein each action carried out simultaneously between the entities generates the score risk, the validation seal and the validation chain for the action, wherein the validation seals are automatically displayed and updated in the indication element of the credit institution, in a real time manner with the performance of each one of the actions between the first and second entities, thereby indicating to the credit institution that each one of the actions is occurring, wherein the favorable or unfavorable expectation parameters are automatically displayed and updated in the indication element of the credit institution, in a real time manner with the performance of each one of the actions between the first and second entities, thereby indicating to the credit institution an expectation of success in implementing each one of the actions agreed between the first entity and the second entity, and wherein the validation chain is automatically displayed and updated in the indication element of the credit institution, in a real time manner with the performance of each one of the actions between the first and second entities, thereby indicating to the credit institution how the first and second entities behaved during the action represented by the validation chain, generate, via execution of the at least one processor, a reliability index linked to at least one from among the first entity and the second entity, wherein the reliability index is generated from the analysis of each of the validation chains for actions carried out with the first entity and/or with the second entity, evaluate, via execution of the at least one processor, the reliability index when receiving, by way of a communications network, a new purchase order for at least one new asset involving at least one of the first entity or the second entity, and generate, via execution of the at least one processor, the score risk for the new purchase order based at least on the reliability index.

\* \* \* \* \*